United States Patent
Ogino et al.

(10) Patent No.: US 6,621,924 B1
(45) Date of Patent: Sep. 16, 2003

(54) CONTOUR EXTRACTION APPARATUS, A METHOD THEREOF, AND A PROGRAM RECORDING MEDIUM

(75) Inventors: Tomotaka Ogino, Tokyo (JP); Takahiro Ishii, Tokyo (JP); Takashi Totsuka, Chiba (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/510,082

(22) Filed: Feb. 22, 2000

(30) Foreign Application Priority Data

Feb. 26, 1999 (JP) .......................... 11-051866
Feb. 26, 1999 (JP) .......................... 11-051870

(51) Int. Cl.⁷ ............................. G06K 9/00; G06K 9/48
(52) U.S. Cl. .................................. 382/165; 382/199
(58) Field of Search ................... 382/199, 165, 382/164, 266, 316, 154; 355/35

(56) References Cited

U.S. PATENT DOCUMENTS

| | | | | |
|---|---|---|---|---|
| 5,448,502 A | * | 9/1995 | Kindo et al. ............ | 382/165 |
| 5,629,752 A | * | 5/1997 | Kinjo ..................... | 355/35 |
| 5,694,483 A | * | 12/1997 | Onoguchi ............... | 382/154 |
| 5,887,082 A | | 3/1999 | Mitsunaga et al. ...... | 382/199 |
| 5,892,853 A | | 4/1999 | Hirani et al. ........... | 382/280 |
| 5,974,194 A | | 10/1999 | Hirani et al. ........... | 382/262 |
| 5,995,662 A | | 11/1999 | Totsuka et al. ......... | 382/199 |

FOREIGN PATENT DOCUMENTS

| | | | | |
|---|---|---|---|---|
| EP | 0 558 049 A2 | 9/1993 | ......... | G06F/15/68 |
| GB | 2 121 534 A | 12/1983 | ......... | G01B/11/03 |
| JP | 1-155476 | 6/1989 | ......... | G06F/15/60 |
| JP | 1-175076 | 7/1989 | ......... | G06F/15/62 |
| JP | 3-291770 | 12/1991 | ......... | G06F/15/70 |
| JP | 4-68763 | 3/1992 | ......... | H04N/1/38 |
| JP | 4-15481 | 5/1992 | ......... | G06F/15/70 |

OTHER PUBLICATIONS

E. Mortensen & W. Barrett, "Intelligent Scissors for Image Composition," SIGGRAPH Computer Graphic Proceedings, Annual Conference (Los Angeles), Aug. 6–11, 1995, pp. 191–198.

U.S. patent application Ser. No. 08/959,247, filed Oct. 20, 1997.

U.S. patent application Ser. No. 09/249,566, filed Feb. 9, 1999.

* cited by examiner

*Primary Examiner*—Jon Chang
*Assistant Examiner*—Brian Le
(74) *Attorney, Agent, or Firm*—Sonnenschein, Nath & Rosenthal LLP

(57) ABSTRACT

There is provided a contour extraction apparatus and a method thereof by which candidate data of a plurality of subjectively evaluable contour curves can be presented to a user by obtaining an accurate color projection axis and the user can be invited to make selection. An update sector extract section 31 obtains an update sector of a closed contour curve from representative points specified by a user. A color projection axis candidate calculator section 32' calculates a plurality of color projection axes which maximizes contrast around an edge within the update sector, based on representative points 1 and 2 and an image. A contour curve generator section 33 generates a contour curve candidate list corresponding to the list of the plurality of color projection axis candidates. The contour curve candidate list generated by the contour curve generator section 33 is displayed on a display device. Further, a user is invited to make selection by a candidate list select section 71, and the color projection axis selected by the user is sent to the contour curve generator section 33. The contour curve generator section 33 generates a new contour curve within the update sector from the image, representative points 1 and 2, and the color projection axis. The update sector synthesizer section 34 synthesizes the contour curve of an updated sector with a closed curve thereby to generate a new closed contour curve.

45 Claims, 20 Drawing Sheets

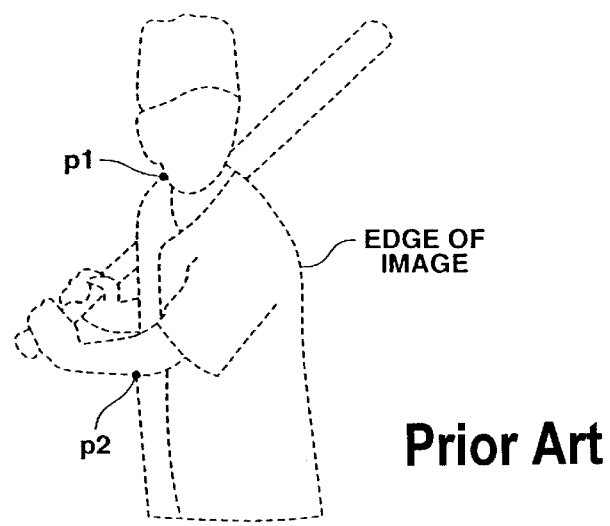
FIG.2A
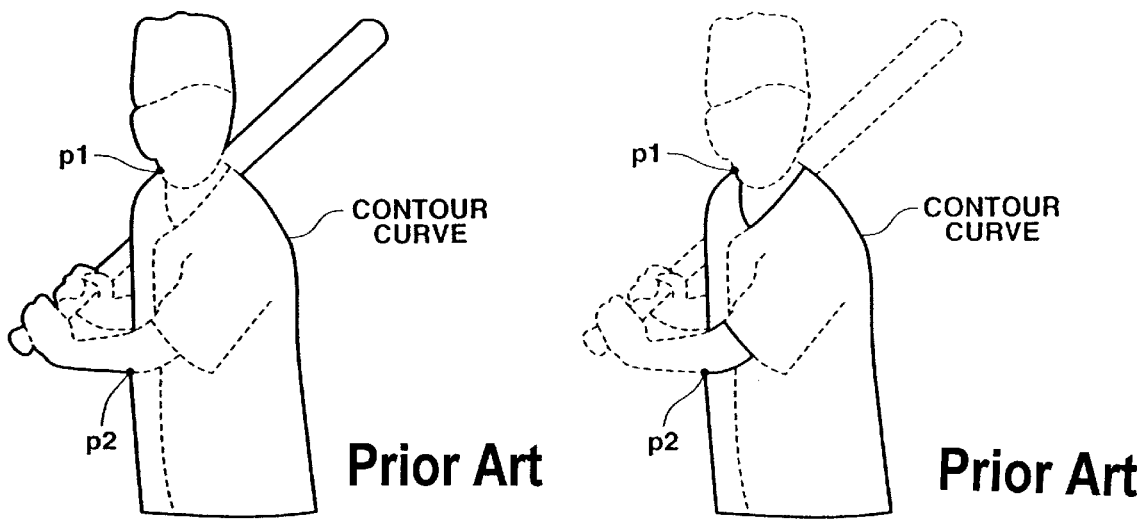
FIG.2B  FIG.2C

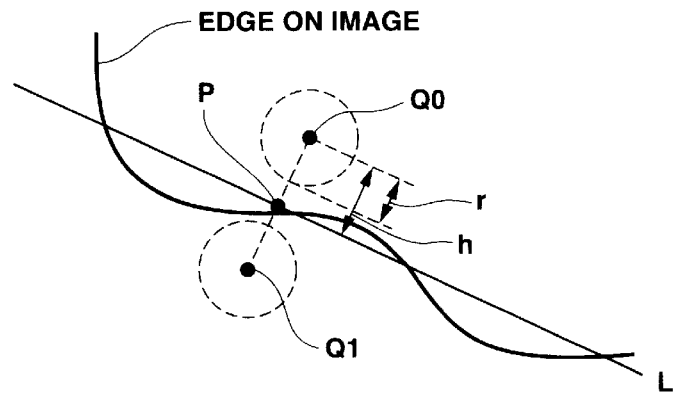
FIG.15
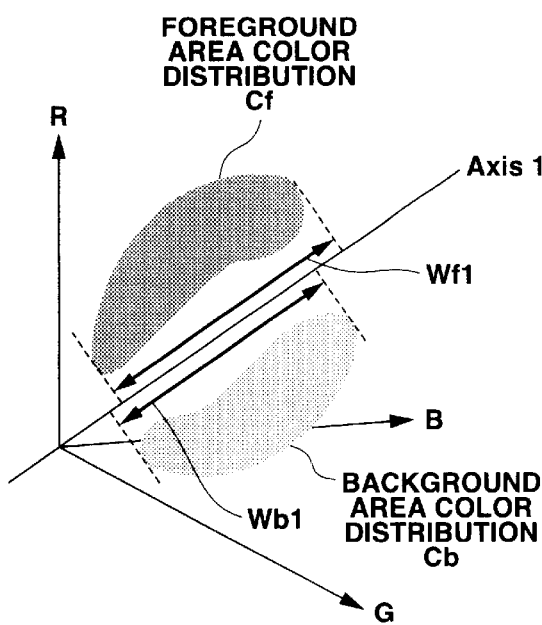 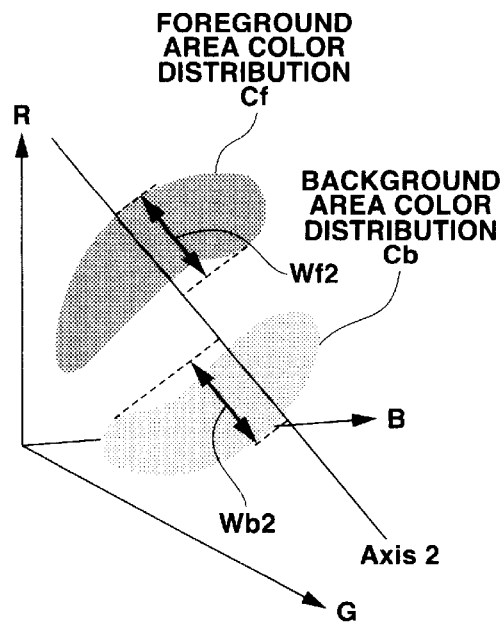
FIG.16A  FIG.16B

MOUTH CURSOR

CONTOUR EXTRACTION APPARATUS, A METHOD THEREOF, AND A PROGRAM RECORDING MEDIUM

BACKGROUND OF THE INVENTION

The present invention relates to a contour extraction apparatus and a method thereof for extracting the contour of an aimed target object from an image, and a program recording medium which records a program adopting the contour extraction method.

When extracting an image of an aimed object from an image and synthesizing the extracted object image with another image, a soft key is used. A soft key generator which generates a soft key is normally constructed by a closed contour curve generator section, a closed end curve generator section, and a soft key generator section. The closed end curve generator section generates closed end curves of both ends from a closed contour curve generated by the closed contour curve generator section, and the soft key generator section uses the closed end curves to generate the soft key.

Of these sections, in the closed contour curve generator section, when a user uses a two-dimensional pointing device such as a mouse or a tablet not shown as an input means and specifies a representative point on an edge of an image, a color space projection axis which maximizes the contrast in the periphery of the edge within an update sector of a closed contour curve is calculated from the coordinates of the specified representative point on the edge, and a new contour curve within the update sector is generated based on the color projection axis or the like. A new closed contour curve is generated from this new contour curve.

Also, in the closed contour curve generator section, more precise area extraction is enabled through input information from an operator.

At first, a conventional method for generating the color projection axis will be specifically explained with reference to FIG. 1.

It is generally known that the color distribution Cf of the foreground area and the color distribution Cb of the background area at the periphery of an edge have a banana shape extending in the brightness axis direction. Therefore, conventionally, the Axis 1 in the brightness direction shown in FIG. 1 is taken as the color projection axis.

Next, explanation will be made of a conventional method which performs more precise area extraction by inserting input information from an operator.

The first conventional technique including a closed contour curve generator section with inserted instruction information is of a type in which an operator determines information that has been automatically extracted but is unnecessary and information that could not be automatically extracted but is necessary, with respect to contour information automatically extracted by any processing, and deletes or adds those information items. Specific examples of prior art belongs to this type will be "Image Contour Detection Method" (Japanese Patent Application KOKAI Publication No. 3-291770) and "Image Edit Apparatus" (Japanese Patent Application KOKAI Publication No. 1-175076).

Further, the second conventional technique is of a type that an operator determines an insufficient portion of an initial input with respect to input information for performing contour extraction processing and further provides a more accurate input to make calculation again. Specific examples of prior art which belong to this type will be "Image Contour Detection Method" (Japanese Patent Application KOKAI Publication No. 4-152481), "Pattern Mask Preparation Method" (Japanese Patent Application KOKAI Publication No. 1-15546), "Clipping Mask Preparation Method" (Japanese Patent Application KOKAI Publication No. 4-68763), and "Intelligent Scissors for Image Composition" (Eric N. Mortensen and William A. Barrett, Computer Graphics Proceeding, Annual Conference Series, 1995, ACM SIGGRAPH, pp. 191–198).

Brief explanation will now be made of operation of each of the conventional techniques described above which include a closed contour curve generator section with inserted input information from an operation.

In the "Image Contour Detection Method" (Japanese Patent Application KOKAI Publication No. 3-291770), an edge detection operator is used to extract a contour in the first automatic extraction, and an operator specifies both ends of a contour which could not be extracted by edge detection processing, thereby to add a line segment connecting the both ends as a contour.

The "Intelligent Scissors for Image Composition" create several relay points on a contour and operates to search and extract a contour point between the points. This search method is based on a search rule using edge information of an image and searches such a path which connects the relay points so as to pass above the edge if possible. It is possible to extract automatically a considerably complicated contour shape. Therefore, this method is advantageous in that a contour can be extracted with use of a relatively small number of relay points.

The "Image Contour Detection Method" (Japanese Patent Application KOKAI Publication No. 4-152481) also creates several relay points on a contour and operates so as to search and extract a contour point between the relay points. This method operates to apply a bias in the search direction depending on the position of the relay point when searching a contour. Therefore, a contour extending in a desired direction can be easily extracted by changing relay points.

In the first conventional technique described above, the accuracy of the final contour greatly depends on the accuracy of first automatic extraction. A problem hence arises in that it cannot be much expected that the contour can be more accurately corrected by later correction operation by an operator.

For example, in the "Image Contour Detection Method" (Japanese Patent Application KOKAI Publication No. 3-291770), manual addition of a contour can be achieved in form of a line segment, so there is a problem concerning the accuracy of the shape.

Also, in the "Image Edit Apparatus" (Japanese Patent Application KOKAI Publication No. 1-175076), the areas divided at first should not be too small in order that correction operation is not complicated. Therefore, color quantization need to be rough appropriately. If color quantization is rough, however, there is a problem that the shape of the divided area and the true object contour shape easily disagree with each other so that the accuracy of the automatically extracted contour shape is lost.

Meanwhile, the second conventional technique is advantageous in the accuracy of the contour because a more accurate input is provided and recalculation is performed on an area where a sufficient result could not be obtained from automatic extraction. However, this second conventional technique includes the following problem.

In the "Pattern Mask Preparation Method" (Japanese Patent Application KOKAI Publication No. 1-155476) and the "Clipping Mask Preparation Method" (Japanese Patent Application KOKAI Publication No. 4-68763), operator's correction functions to change partially an input concerning the background color or foreground color as described above and perform recalculation as to contour extraction in the corresponding portion thereby to correct the contour shape. However, the color input operation is equivalent to operation of carrying out level adjustments of keys in a chroma key device, as it were. Since this kind of operation does not achieve direct inputting of information concerning a contour shape, it is difficult for an operator to carry out intuitively correct inputting, and therefore, try and error are repeated several times to attain a desired contour shape.

In contrast, in the "Image Contour Detection Method" (Japanese Patent Application KOKAI Publication No. 4-152481) and the "Intelligent Scissors for Image Composition" (which will be hereinafter called a conventional technique for inputting a relay point), operator's correction is to operate a relay point on a contour and functions to make recalculation as to a contour shape concerning a corrected relay point. In this method, an input concerning a contour shape is directly supplied so that it is relatively easy for the operator to carry out intuitively correct inputting.

Meanwhile, in the method explained above with reference to FIG. 1, the color distribution Cf of the foreground area is projected on the range of Wf1. On the other hand, the color distribution Cg of the background area is projected on the range of Wb1. This results in that the color changes within each of the areas Cf and Cb is large while the color change between the areas Cf and Cb is small. The color change of an edge area of an image corresponds to the color change between the areas Cf and Cb, so the Axis 1 is not of good quality as a color projection axis. Consequently, a new contour within an update sector, which is generated by the color projection axis, does not attain good quality, and therefore accurate softkeys cannot be generated.

Also, in case where input information from an operator is inserted in the closed contour generator section, whether or not an obtained contour curve passes along the edge is determined depending on subjective evaluation made by a user, and the following problem hence arises.

Explanation will be made exemplifying a case of an image of a boy with a bat shown in FIG. 2(A). In FIG. 2(A), supposing that points p1 and p2 are set, which edge is expected by a user is discussed.

If the user has an object of "obtaining a contour surrounding entirely the boy", the contour curve which is expected by the user will be as shown in FIG. 2(B).

Otherwise, if the user desires to "obtain a contour surrounding only the uniform to change the color of the boy's uniform", the contour curve which the user expects will be as shown in FIG. 2(C).

Which of edges the contour curve desired by the user passes along changes depending on the subjectivity and object of the user in many cases and cannot be determined uniformly. Therefore, there possibly be a case that even a result obtained through proper work of a certain automatic calculation algorithm cannot satisfy the intension of a user.

That is, one single output result obtained by one single algorithm is used for a data processing section 100 for which evaluation based on the subjectivity of a user is required. A problem hence arises in that it is not always possible to satisfy the request from the user which can vary depending on the subjectivity and object.

The present invention has been made in view of the actual situation as described above and has an object of providing a contour extraction apparatus and a method thereof which are capable of presenting a plurality of subjectively evaluable candidate data items to a user and allows the user to make selection, by extracting an accurate color projection axis to obtain a contour curve, with respect to data processing for attaining an output result for which evaluation depending on user's subjectivity.

BRIEF SUMMARY OF THE INVENTION

In order to achieve the above object, a contour extraction apparatus according to the present invention which extracts a contour of an object from an image comprises: update sector extractor means for obtaining a set of representative points which sandwich an update sector, from coordinates of representative points on an edge of the object and an initial closed curve; color projection axis calculator means for obtaining a color projection axis, based on color information within the update sector obtained by the update sector extractor means; contour curve generator means for generating a contour curve within the update sector, from the color projection axis obtained by the color projection axis calculator means, the set of representative points obtained by the update sector extractor means, and the image; and closed contour curve synthesizer means for synthesizing the contour curve within the update sector, which has been generated by the contour curve generator means, with the closed contour curve, thereby to generate a new closed contour curve.

Also, to achieve the above object, a contour extraction method according to the present invention for extracting a contour of an object from an image comprises: an update sector extract step of obtaining a set of representative points which sandwich an update sector, from coordinates of representative points on an edge of the object and an initial closed curve; a color projection axis calculate step of obtaining a color projection axis, based on color information within the update sector, obtained by the update sector extract step; a contour curve generate step of generating a contour curve within the update sector, from the color projection axis obtained by the color projection axis calculate step, the set of representative points obtained by the update sector extract step, and the image; and a closed contour curve synthesize step of synthesizing the contour curve within the update sector, which has been generated by the contour curve generate step, with the closed contour curve, thereby to generate a new closed contour curve.

Further, a program recording medium according to the present invention records a contour extract program for extracting a contour of an object from an image, the program comprising: an update sector extract step of obtaining a set of representative points which sandwich an update sector, from coordinates of representative points on an edge of the object and an initial closed curve; a color projection axis calculate step of obtaining a color projection axis, based on color information within the update sector, obtained by the update sector extract step; a contour curve generate step of generating a contour curve within the update sector, from the color projection axis obtained by the color projection axis calculate step, the set of representative points obtained by the update sector extract step, and the image; and a closed contour curve synthesize step of synthesizing the contour curve within the update sector, which has been generated by the contour curve generate step, with the closed contour curve, thereby to generate a new closed contour curve.

According to the present invention, a color projection axis calculate means and a step thereof obtain a color projection axis which maximizes the contrast in the periphery of an edge within an update sector, from a set of representative points obtained by an update sector extract means and a step thereof and an image. As a result, it is possible to provide a contour extraction apparatus and a method thereof which are capable of presenting candidate data of a plurality of subjectively evaluable contour curves to a user and inviting the user to make selection therefrom.

BRIEF DESCRIPTION OF THE SEVERAL VIEWS OF THE DRAWINGS

FIGS. 2A, 2B and 2C are views for explaining problems of a conventional contour extraction method.

FIG. 15 is a view for explaining operation principles of a color information obtaining section for an area around an edge, which forms part of the near-representative-point optimum color projection axis calculator section shown in FIG.

FIGS. 16A and 16B are views for explaining operation principles of a color projection axis calculator section forming part of the near-representative-point color projection axis calculator section shown in FIG. 1.

DETAILED DESCRIPTION OF THE INVENTION

Figure 1:
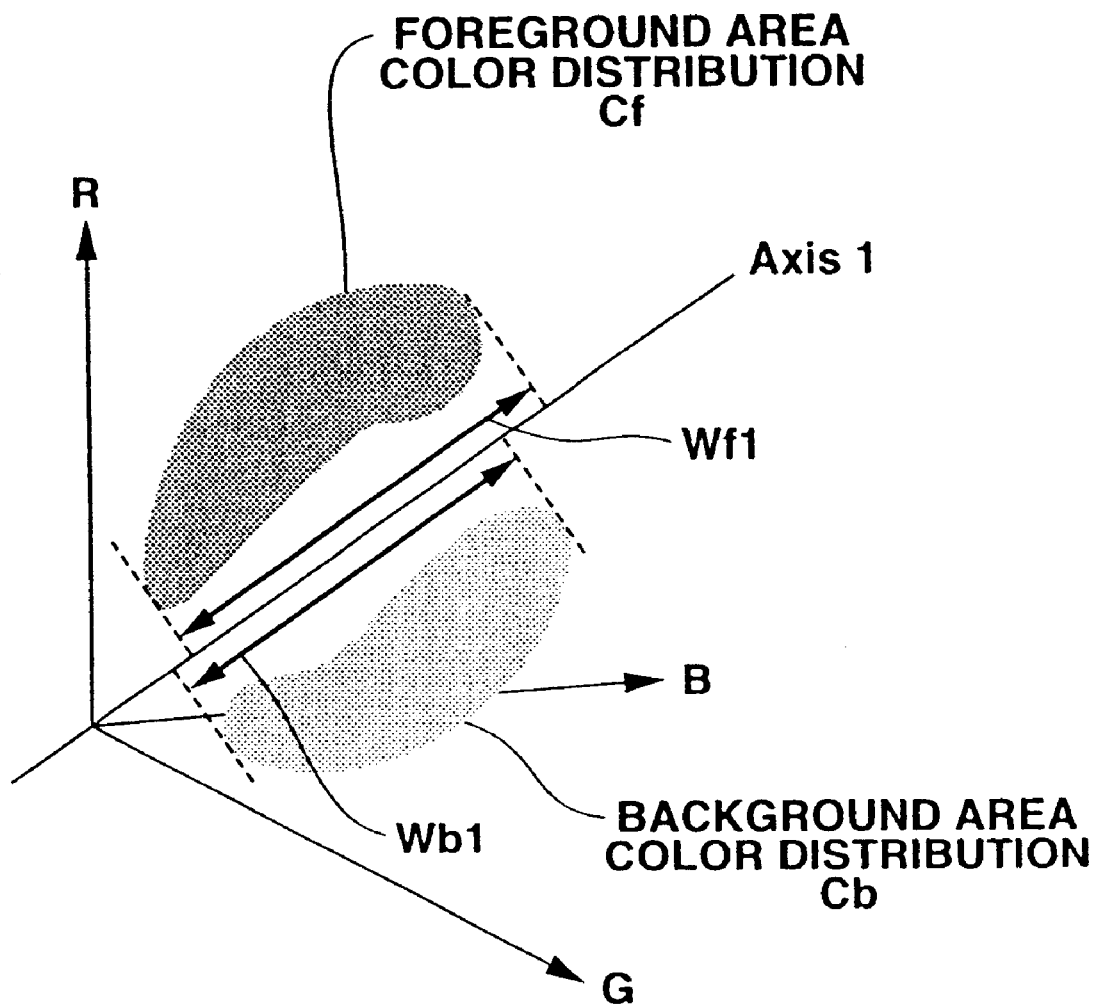
FIG. 1 is a view for explaining a specific conventional method for generating a color projection axis.

In the following, embodiments of the present invention will be explained with reference to the drawings. The embodiments relate to a key generation apparatus shown in FIG. 4 which generates a softkey based on a contour area extracted with use of a contour extraction apparatus according to the present invention.

A two-end closed curve is generated from a closed contour curve obtained by the closed contour curve generator section 21, and a softkey generator section 23 generates a key image from the two-end closed curve.

The closed contour curve generator section 21 is a specific example of the contour extraction apparatus according to the present invention. A plurality of results generated through a plurality of algorithms and a plurality of parameters from an input consisting of an image, a closed curve of an initial shape, and representative points on the edge are converted into subjectively evaluable data items and are then presented as candidates. In response to a simple operation such as a selection made by a user, a closed contour curve as desired from the user is rapidly generated.

Operational principles of this closed contour curve generator section 21 will be explained with reference to FIG. 5. The section conceptually comprises a data processing section 10, a data converter section 11, a display device 12, an operation device 13, and an output data selector section 14.

The data processing section 10 applies algorithms and parameters to input data and presents a candidate list showing a plurality of output data items. The data converter section 11 generates a candidate list of data items which a user can subjectively evaluate. This candidate list is displayed on the display device 12.

Watching the display device 12, the user selects the candidate as the user desires, and then, the number of the selected candidate is supplied to the output data selector section 14. The data selector section 14 sends output data as desired by the user to the display device 12 again. In this manner, the user can attain a result which the user expects.

Explanation will be made later as to the details of the function of the closed contour curve generator section 21 to which the present invention is applied, i.e., the function of converting a plurality of results generated through a plurality of algorithms and a plurality of parameters into subjectively evaluable data, presenting them as candidates to the user, and allowing the user to make selection therefrom, thereby to generate a closed contour curve as desired by the user. Firstly, however, a new technique which is applicable when the closed contour curve generator section 21 generates a closed contour curve.

Figure 6:
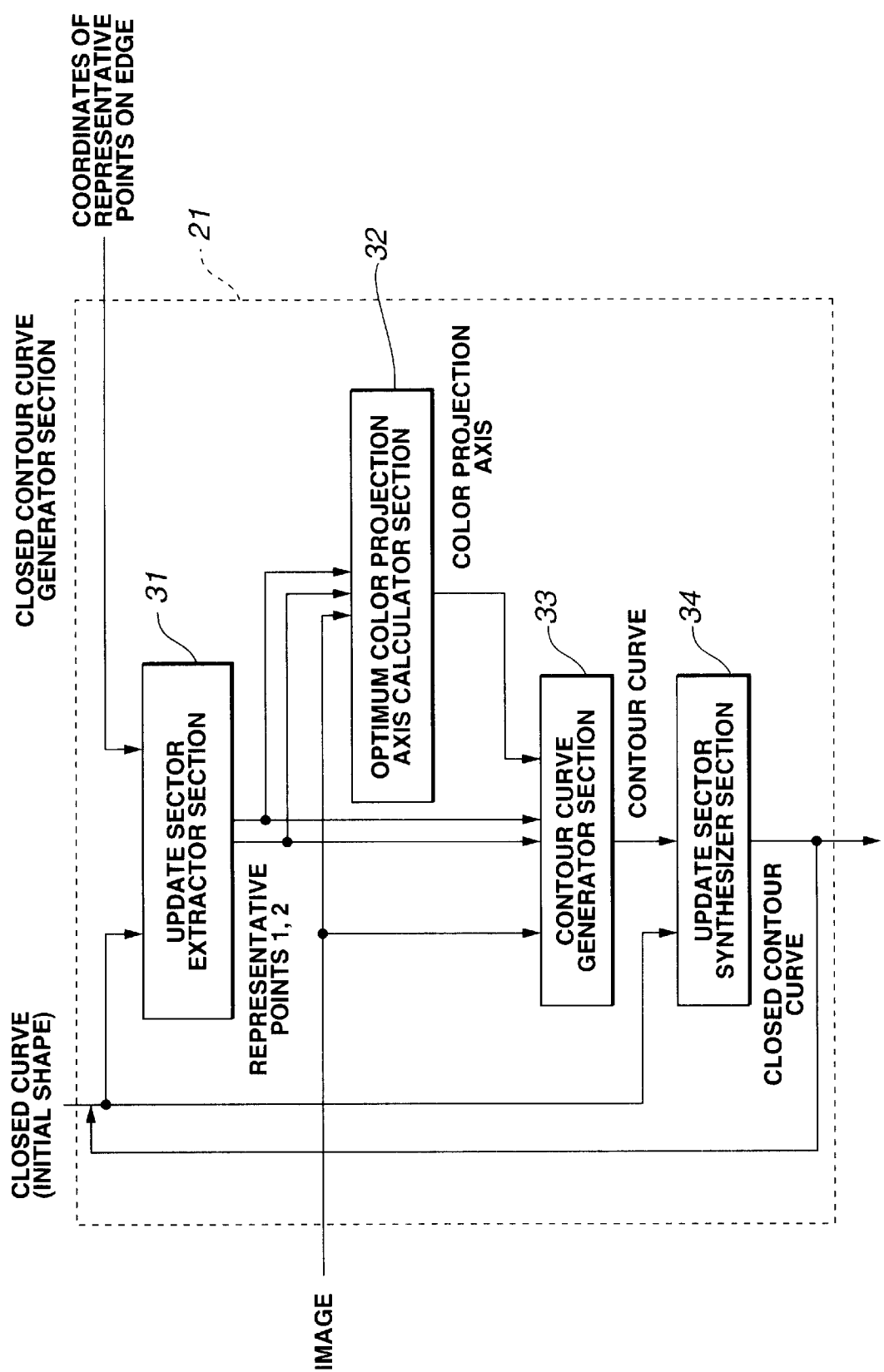
FIG. 6 is a block diagram showing the structure of the closed contour curve generator section when generating a closed contour curve.

FIG. 6 shows specifically the structure of the closed contour curve generator section 21. This closed contour curve generator section 21 is comprised of an update sector extraction section 31, an optimum color projection axis calculator section 32, a contour curve generator section 33, and an update sector synthesizer section 34.

In the update sector extraction section 31, as a representative point is specified by a user, an update sector of a curve is extracted and representative points 1 and 2 which sandwich the update sector properly without any excess or shortage are obtained. More specifically, the user uses a two-dimensional pointing device such as a mouse or tablet as an input means and specifies a representative point on the edge of an image. Then, the coordinates of the representative point are supplied to the update sector extraction section 31. Also, for example, a circular, rectangular, or polygonal closed curve may be supplied as an initial shape to the update sector extraction section 13. Using the coordinates of these representative points on the edge and the initial shape, the update sector extraction section 31 obtains the representative points 1 and 2 which sandwich properly an update sector without excess or shortage.

The optimum color projection axis calculator section 32 obtains a color space projection axis which maximizes the contrast in the periphery of the edge in the update sector, based on the representative points 1 and 2. This optimum color projection axis calculator section 32 will be described in details later.

The contour curve generator section 33 generates a new contour curve within the update sector from the color projection axis. This contour curve generator section 33 will also be described in details later.

The update sector synthesizer section 34 synthesizes the contour curve in an updated sector with a closed curve, thereby to generate a synthesis result as a closed contour curve. While update is taking place by moving, adding, or deleting a representative point by a user, the closed contour curve is kept being updated.

Figure 7:
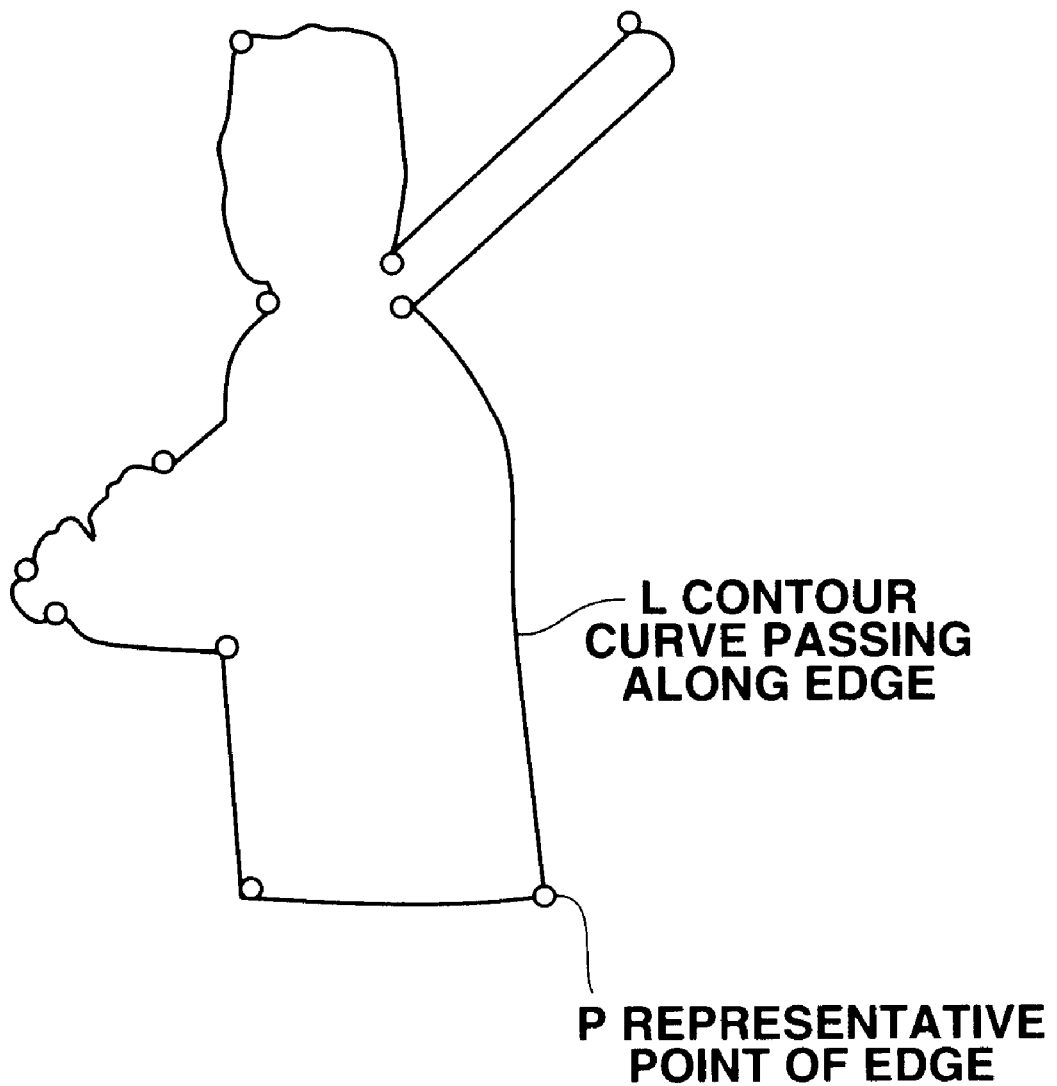
FIG. 7 is a view showing a specific example of a closed contour curve generated by the closed contour curve generator section shown in FIG. 6.

FIG. 7 shows a specific example of a closed contour curve generated by the update sector synthesizer section 34. That is, the closed contour curve is defined by representative points on an edge whose coordinates are directly specified by a user and a spline curve passing through the representative points along the edge.

Figure 8:
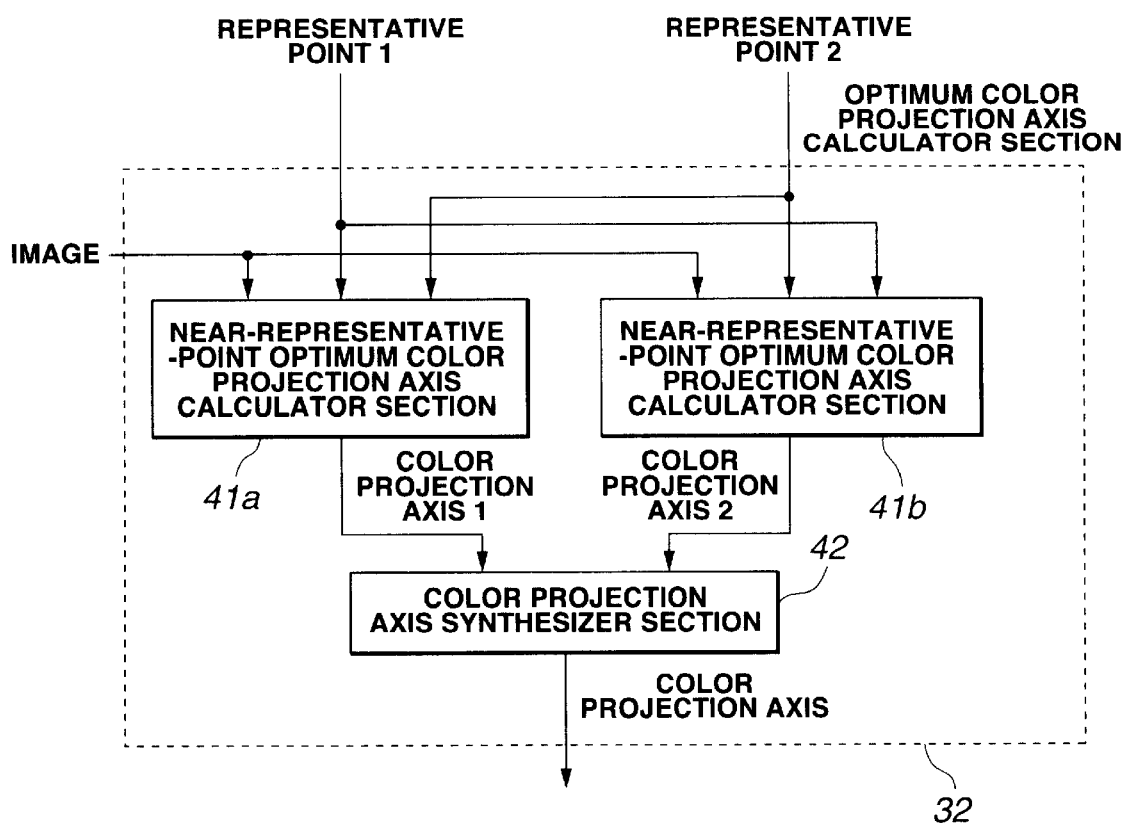
FIG. 8 is a block diagram showing details of the structure of an optimum color projection axis calculator section forming part of the closed contour curve generator means shown in FIG. 6.

FIG. 8 shows the details of the optimum color projection axis calculator section 32. The optimum color projection axis calculator section 32 is comprised of near-representative-point optimum color projection axis calculator sections 41a and 41b which respectively calculate near optimum color projection axes in areas near the representative points 1 and 2, and a color projection axis synthesizer section 42 which synthesizes a color projection axis with use of the color projection axes 1 and 2 from the two calculator sections 41a and 41b.

Figure 9:
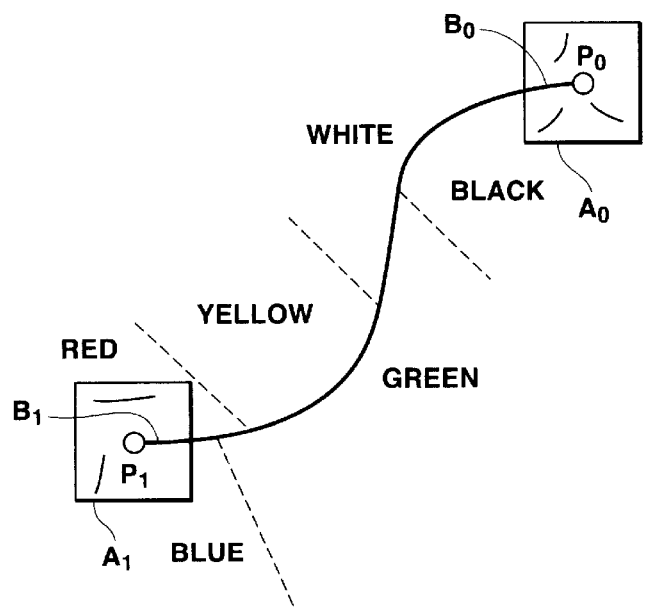
FIG. 9 is a view for explaining operation principles of a near-representative point optimum color projection axis calculator section forming part of the optimum color projection axis calculator means shown in FIG. 8

The near-representative-point optimum color projection axis calculator section 41 obtains a near optimum color projection axis which maximizes the contrast around an edge included in an area near a representative point. Suppose now that representative points 1 (p0) and 2 (p1) are specified as shown in FIG. 9. At this time, the near-representative-point color projection axis calculator section 41a calculates a color projection axis (1) B0 which maximizes the contrast, within the edge included in the near area A0 of the representative point p0, while the near-representative-point color projection axis calculator section 41b calculates a color projection axis (2) B1 which maximizes the contrast, within the edge included in the near area A1 of the representative point p1. The detailed structure of the near-representative-point color projection axis calculator section 41 will be explained later.

The color projection axis synthesizer section 42 synthesizes the near optimum color projection axes (1) B0 and (2) B1 to obtain one color projection axis which maximizes the contrast in the periphery of the edge within the update sector. The synthesis method used herein may take an average vector of color projection axes as an axis after synthesis, for example. In this case, however, when the vectors of two color projection axes form an obtuse angle, attention should be paid to the point explained below with reference to FIG. 10.

Figure 10A:
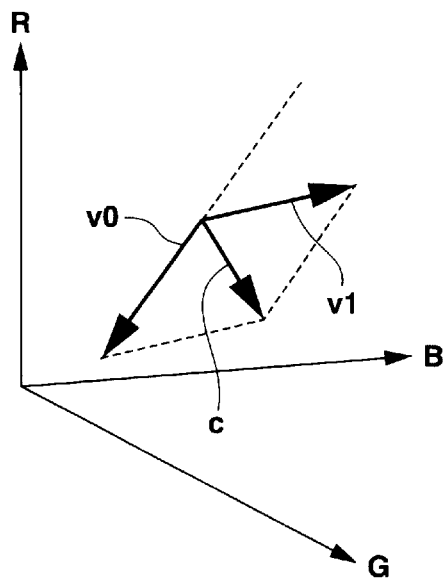
FIGS. 10A and 10B are views for explaining operation principles of a color projection axis synthesizer section forming part of the optimum color projection axis calculator section shown in FIG. 8.
Figure 10B:
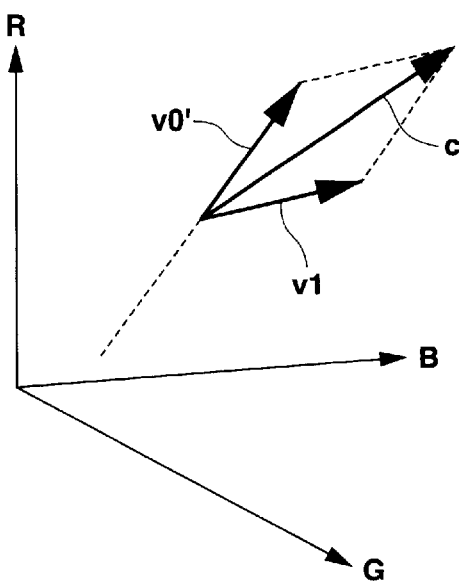

Suppose that the color projection axis vectors obtained from the representative points on the edge at both ends of an update sector are v0 and v1, as shown in FIG. 10(A). At this time, where a synthesized vector c of v0 and v1 defined by the following equation is the color projection axis of the sector, c is oriented in the direction substantially vertical to both of v0 and v1 and is therefore not preferable as a color projection axis of the sector.

$$c=v0+v1$$

This is because v0 and v1 form an obtuse angle. In case of an obtuse angle, i.e., when the inner product v0 v1 is negative, a synthesized vector c' is obtained by inverting either one of the vectors as indicated by the following equations, e.g., with respect to v0' as an inversion of v0 and v1. This synthesized vector c' is used as the color projection axis.

$$v0'=-v0$$

$$c'=v0'+v1$$

In this manner, it is possible to obtain an axis which is almost horizontal to both of v0 and v1.

Next, the detailed structure of the near-representative-point color projection axis calculator section 41 will be specifically explained below with reference to FIG. 11 although orders of explanations are reversed. The near-representative-point color projection axis calculator section 41 is comprised of a liner edge detector section 51, a color information obtaining section 52 for the periphery of an edge, and a color projection axis calculator section 53.

For example, the linear edge detector section 51 in the near-representative-point color projection axis calculator section 41a which obtains a color projection axis near the representative point 1 detects a linear edge component contained in the near area A0 of the representative point 1 (p0) shown in FIG. 9, based on an image, the representative point 1, and an adjacent point (an adjacent representative point 2), thereby to obtain an equation expressing the line. If a plurality of linear edges are included in the image of the near area A0, the strongest edge is adopted.

Meanwhile, the linear edge detector section 51 in the near-representative-point color projection axis calculator section 41b which obtains a color projection axis near the representative point 2 detects a linear edge component contained in the near area A1 of the representative point 2 (p1) shown in FIG. 9, based on the image, the representative point 2, and an adjacent point (an adjacent representative point 1), thereby to obtain an equation expressing the line. If a plurality of linear edges are included in the image of the near area A1, the strongest edge is adopted likewise.

The operation principles and detailed structure of the linear edge detector section 51 will be explained below with reference to FIGS. 12 to 14, more specifically.

Figure 12:
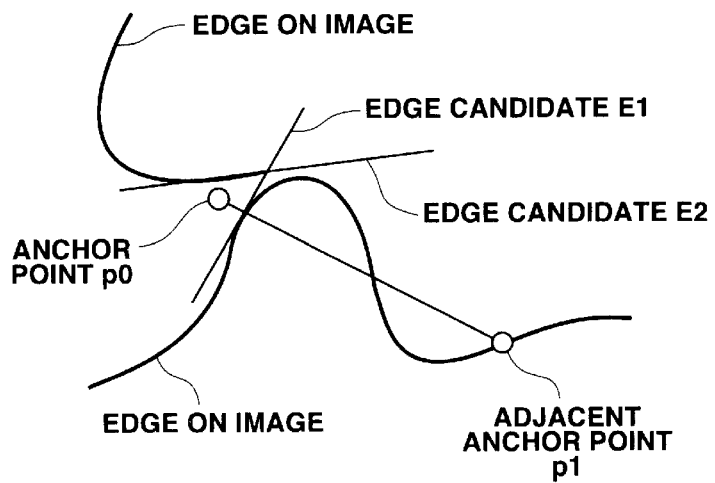
FIG. 12 is a view for explaining operation principles of a linear edge detector section forming part of the near-representative-point optimum color projection axis calculator section shown in FIG. 11.
Figure 13:
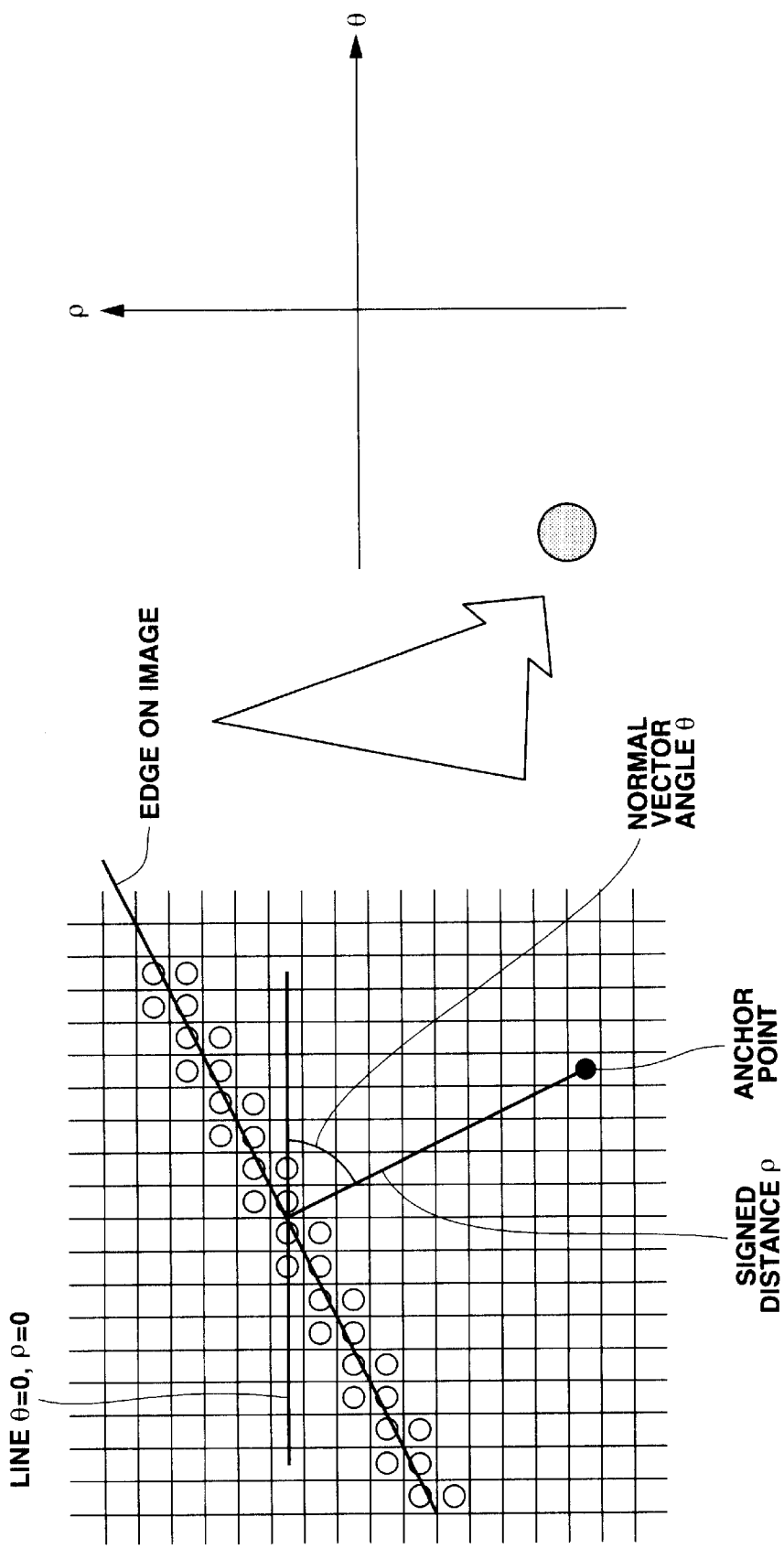
FIGS. 13A and 13B are views for explaining an operation principle of an estimation method in which the linear edge detector section forming part of the near-representative-point color projection axis calculator section shown in FIG. 11 estimates the position and direction of an edge.

FIG. 12 shows a state where the representative point (anchor point) p0 is slightly out of the edge of an image. Since representative points are set thus out of the edge in many cases, the position and direction of the edge must be estimated by the linear edge detector section 51 even in those cases in order to improve the operationality.

Further, in FIG. 12, the edge near the representative point p0 is not limited to one but there may be a plurality of edge candidates such as E1 and E2. Therefore, the output of the linear edge detector section 51 is not one but should naturally be a list of lines whose orders are ranked by priority levels.

Next, with reference to FIG. 13, explanation will be made of a method of estimating the position and direction of an edge with use of Hough conversion, taken into consideration that the edges tend to be linear in the local area as the vicinity of a representative point.

If a linear edge exists near a representative point as shown in FIG. 13(A), the gradient direction of the pixels on the edge is vertical to the edge. Where the angle of the gradient direction is θ and the signed distance between the edge and the anchor point is ρ, all the pixels that exist on one equal edge have θ and ρ similar to each other, and are therefore concentrated to the local area as indicated in FIG. 13(B) when plotted on the space defined by θ and ρ.

This principle is used to prepare a two-dimensional histogram on the space defined by θ and ρ, and the frequencies thereof are used to detect a linear portion.

Figure 14:
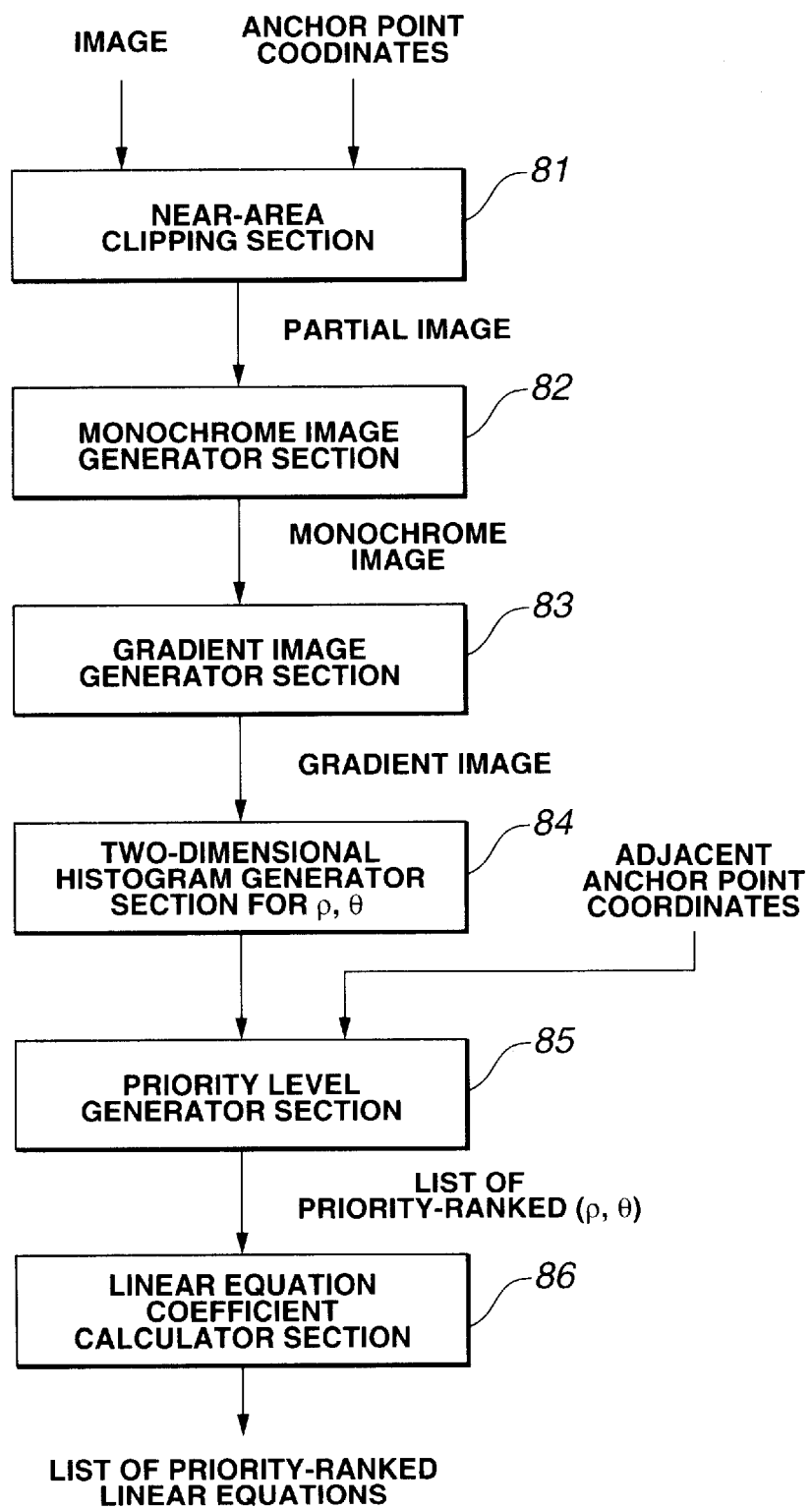
FIG. 14 is a block diagram showing the structure of the linear edge detector section forming part of the near-representative-point optimum color projection axis calculator section shown in FIG. 11.

FIG. 14 shows the specific structure of the linear edge detector section 51. At first, the near-area clipping section 81 generates a partial image by clipping out a local area near an anchor point.

The monochrome image generator section 82 generates a monochrome image projected onto an appropriate color projection axis, e.g., the luminance axis. In this case, since the monochrome image is used for coarse estimation, the appropriate axis need not be an optimum axis.

The gradient image generator section 83 applies a Sobel filter or the like to the monochrome image thereby to generate a gradient image.

The two-dimensional histogram generator section 84 calculates ρ and θ for all the pixels of the gradient image and generates a histogram. Where an anchor point is used as an origin and the gradient vector at a given pixel P(x, y) is (gx, gy), ρ and θ are obtained as follows.

$$\rho = -(gx\ x + gy\ y)/sqrt(gx^2 + gy^2)$$

$$\theta = \arctan(gy/gx)$$

In these equation, sqrt expresses a square root.

The priority level generator section 85 ranks the priority levels with use of the frequencies in the histogram, values of ρ, and the directions to the adjacent anchor points.

The linear equation coefficient calculator section 86 obtains coefficients of the linear equation based on the values of ρ and θ. Where the linear equation is ax+by+c=0, the followings are given.

$$a = \cos\theta$$

$$b = \sin\theta$$

$$c = -\rho$$

The linear edge detector section 51 can thus obtain a linear equation and supplies the obtained linear equation to the edge-periphery color information obtaining section 52. As has been already explained in FIG. 12, if the edge near the representative point p0 cannot be limited to one but a plurality of edge candidates can exist, the output from the linear edge detector section 51 should not be one but it should be natural to output a list of lines whose orders are ranked by the priority levels.

Next, the edge-periphery color information obtaining section 52 samples the periphery of a line (edge) detected by the edge detector section 51 and generates histograms of color distributions classified into one side of the edge and the other side thereof. Specifically, there is a method of obtaining the color within an area having a diameter of several pixels at a position apart from a line by a fixed distance. With reference to FIG. 15, explanation will now be made of the operation of the edge-periphery color information obtaining section 52 based on this method.

Suppose that a line L which approximates an edge on an image is set as shown in FIG. 15. At this time, circles having a radius r and centers Q0 and Q1 are set at positions which pass through a pint P on the line L and are distant by a distance h in direction vertical to the line, and the colors in these areas are sampled. In this manner, the color information in the periphery of the edge can be obtained near the point P.

Returning to FIG. 11, the color projection axis calculator section 53 obtains a color projection axis which maximizes the contrast of the edge from the color distributions of the edge-periphery color information obtaining section 52. For example, this is a method in which a vector connecting the gravity centers of the distributions in both sides of the edge in the color space is adopted as the axis.

The operation of calculating the color projection axis in the color projection axis calculator section 53 will be explained below with reference to FIGS. 16A and 16B.

It is known that the color distribution in the periphery of an edge has a banana-like shape extending in the luminance axis direction as shown in FIGS. 16(A) and 16(B).

At this time, where the Axis 1 in the luminance axis direction is a color projection axis, the color distribution Cf in the foreground area is projected onto the range Wf1. Meanwhile, the color distribution Cb in the background area is projected onto the range Wb1. Consequently, the color change in each of the areas Cf and Cb is large while the color change between the areas Cf and Cb is small. The color change in the edge area of an image becomes the color change between the Cf and Cb, the Axis 1 is not the color projection axis to be obtained.

If the Axis 2 substantially vertical to the luminance axis direction is set as a color projection axis as shown in FIG. 16(B), Cf and Cb are respectively projected onto Wf2 and Wb2, so the color change is small in each of the areas of Cf and Cb. Therefore, the Axis 2 is close to the color projection axis to be obtained.

This will be expressed as a formula below. Where the color projection axis vector is a, the sum of in-class square sum matrixes is Qw, and the between-class square sum matrix between the color distributions Cf and Cb is Qb, the followings are given.

The in-class variance of Cf and Cb is aTQwa, and the between-class variance between Cf and Cb is aTQba, where Ta expresses translocation of a.

The color projection axis calculator section 53 should obtain only the axis a which enlarges the ratio of the between-class variance to the in-class variance as much as possible.

Where the average of Cf is F*, the average of Cb is B*, and the inverted matrix of Qw is Iw, the above-described a can be expressed as follows.

$$a=Iw(F*-B*)$$

This is used as the color projection axis.

The above has been a specific explanation to the optimum color projection axis calculator section 32 shown in FIG. 6. Also, this optimum color projection axis calculator section 32 may obtains an optimum color projection axis by the method indicated in FIGS 17A and 17B.

Figure 17A:
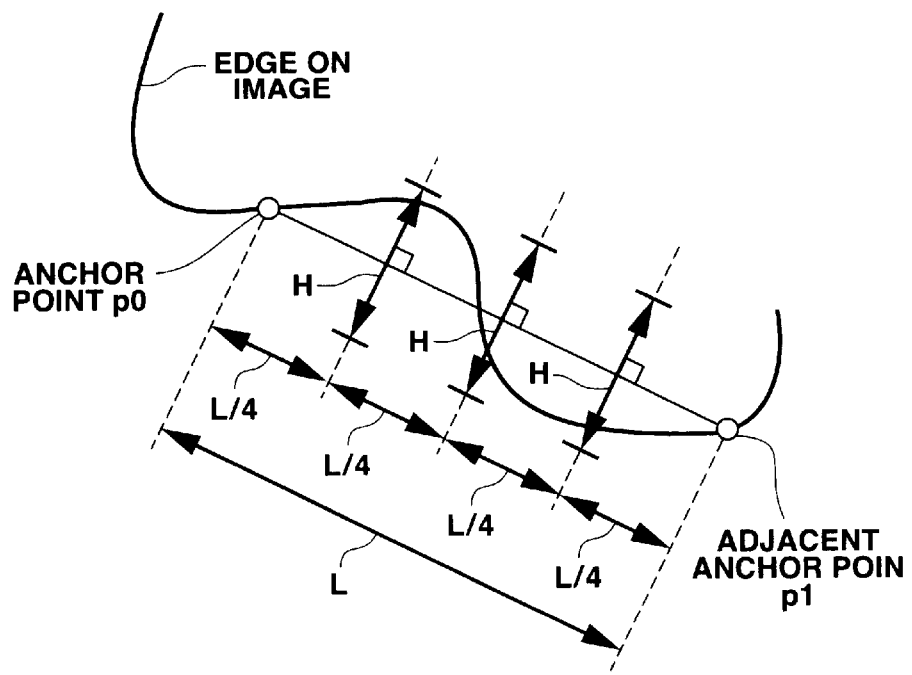
FIGS. 17A and 17B are views for explaining another operation principle of an optimum color projection axis calculator section forming part of the closed contour curve generator section shown in FIG. 6.

Suppose that an anchor point p0 and an adjacent anchor point p1 are set as shown in FIG. 17(A). At this time, there is a possibility that the edge is quite out of a line segment connecting p0 and p1. Therefore, the area that has the largest color change within a range of length H on the line segment vertical to the line segment p0–p1 is searched with respect to each of points q0, q1, and q2 set at equal intervals with respect to the line segment length L on the line segment p0–p1, e.g., at an interval of L/4.

Where the color of a given point r is C(r), the color change vector is defined by dC/dr and the magnitude thereof is defined by |dC/dr|. The point r which maximizes this value is obtained.

Suppose that r0, r1, and r2 are obtained as a result of the search. At this time, the color change vector dC/dr is obtained at each of r0, r1, and r2, and the average value thereof is used as the optimum color projection axis.

Otherwise, the color change vector may be obtained in the following manner. In case of r0, colors C(s00) and C(s01) are obtained with respect to points s00 and s01 which are situated on a line vertical to the line segment p0–p1 with r0 situated at the center therebetween and are distant from each other by a distance width h. The differential vector ΔC=C(s01)–C(s00) between the colors is used to substitute the color change vector. The same is the cases with r1 and r2.

Next, details of the contour curve generator section 33 in FIG. 6 will be explained with reference to FIG. 18. This contour curve generator section 33 is comprised of a high-contrast monochrome image generator section 61, a gradient vector field generator section 62, a minimum cost path search section 63, and a spline curve generator section 64.

The high-contrast monochrome image generator section 61 generates a monochrome image obtained by projecting the color of each pixel of an image onto an inputted color projection axis.

The gradient vector field generator section 62 generates a two-dimensional gradient vector field on the X-Y plane by applying an gradient detection operator to the monochrome image.

The minimum cost path search section 63 obtains a discrete pixel string which expresses such a path that minimizes an accumulated cost by taking the part where the edge is strong as a low-cost portion. The spline curve generator section 64 generates a smooth spline curve from the pixel string.

Further, the update sector synthesizer section 34 synthesizes a contour curve within an update sector with a closed curve thereby to generate a new closed contour curve. While update is taking place by moving, adding, or deleting a representative point by a user, the closed contour curve is kept also being updated.

Figure 4:
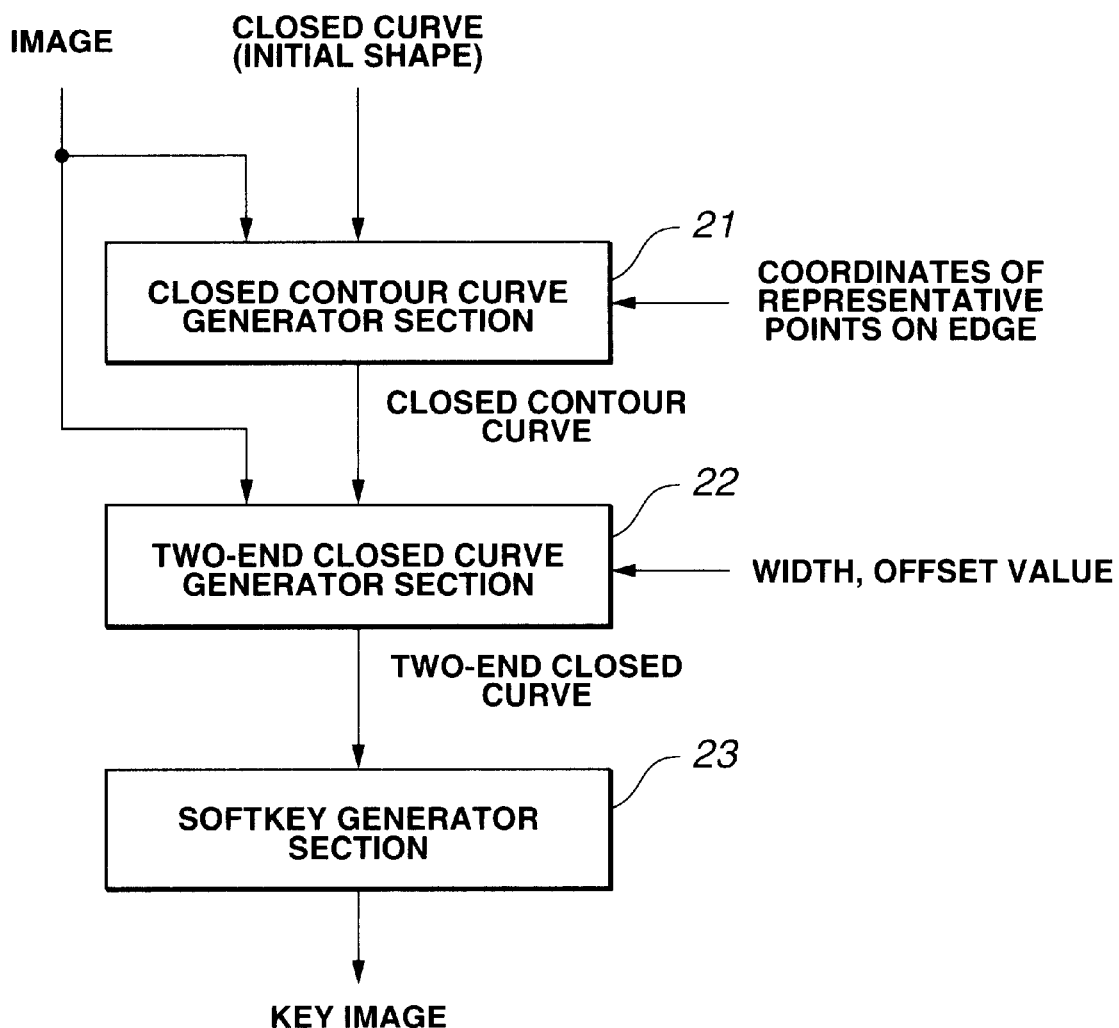
FIG. 4 is a block diagram as an embodiment of the present invention.

The explanations made above are the details of the closed contour curve generator section 21 shown in FIG. 4 which generates a closed contour curve with use of a new technique. In this closed contour curve generator section 21, it is possible to obtain an accurate color projection axis which maximizes the contrast of an edge by means of the optimum color projection axis calculator section 32, so an accurate contour curve can be obtained. Accordingly, a key generator apparatus comprising this contour curve generator section 21 is capable of generating an accurate softkey.

The key generator apparatus using the closed contour curve generator section 21 (which is structurally similar to the key generator apparatus shown in FIG. 4) internally includes a two-end closed curve generator section 22 which generates a two-end closed curve from an image and a closed contour curve generated by the closed contour curve generator section 21, as shown in FIG. 6, and a softkey generator section 23 which generates a key image from the two-end closed curve generated by this two-end closed curve generator section 22.

The two-end closed curve generator section 22 generates a two-end closed curve from a closed contour curve as described above. More specifically, a two-end closed curve is generated with use of the "Contour Extraction Method" disclosed in Japanese Patent Application KOKAI Publication No. 10-164436 by the present applicant.

This "Contour Extraction Method" decides a contour area with respect to the contour of a target object, calculates a gradient vector in the contour area, extracts boundary positions inside and outside an edge along the edge of the contour area based on the gradient vector in the contour area, generates a boundary coordinate information item expressing the boundary for each of the inside and outside of the edge, and generates two boundary curves which respectively approximate shapes expressed by the boundary coordinate information items, as two-end closed contour curves.

Further, the two-end closed curve generator section 22 may generate two-end closed curves deformed into a shape reflecting a width and an offset value through a curve deformation technique which is disclosed in the specification and drawings of Japanese Patent Application No. 10-268687 by the present applicant.

In this curve deformation technique, two curves representing inside and outside boundary positions on a contour of a target object included in an image are converted into point strings thereby to generate a point string for each curve. The dot strings of the curves are linked with each other to change coordinates of the points. Two curves, i.e., two-end contour closed curves are re-constructed from the coordinates of the points whose coordinates have been changed as described above.

The softkey generator section 23 generates a three-dimensional curved surface added with a -axis based on the two-end curves and generates a softkey image which smoothly changes in the area sandwiched between the two-end curves.

Figure 3:
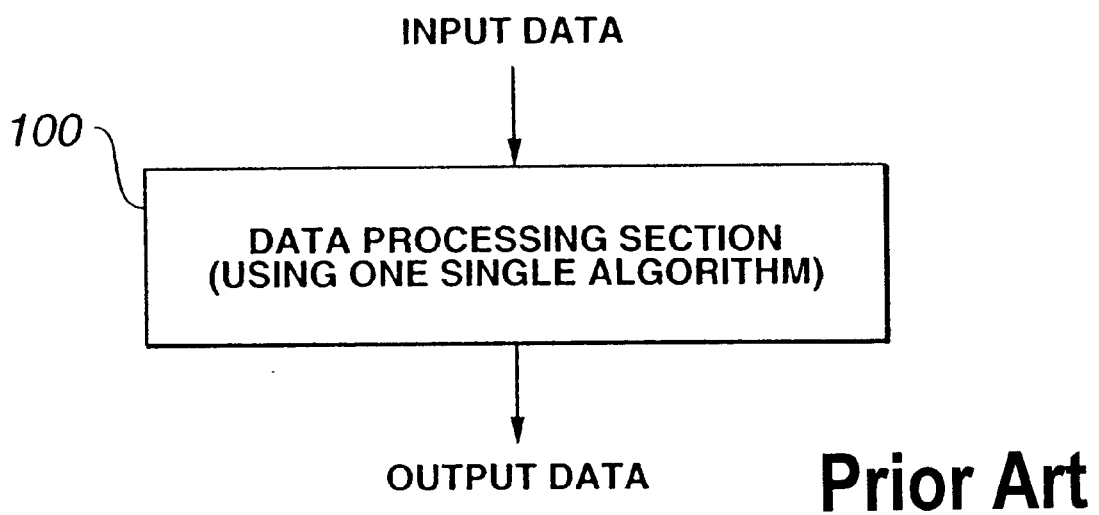
FIG. 3 is a view where the problems of the conventional contour extraction method are generalized.

However, in the key generator apparatus using the closed contour curve generator section 21 for generating one closed contour curve as described above, merely one output is obtained in response to one kind of input in each step of data processing, as explained with reference to FIG. 3. Therefore, if edge representative points of both ends are decided, the contour curve within the sector is decided uniquely. If this unique result does not satisfy the subject of the user, a countermeasure can only be taken by changing, adding, or deleting the representative points.

Figure 11:
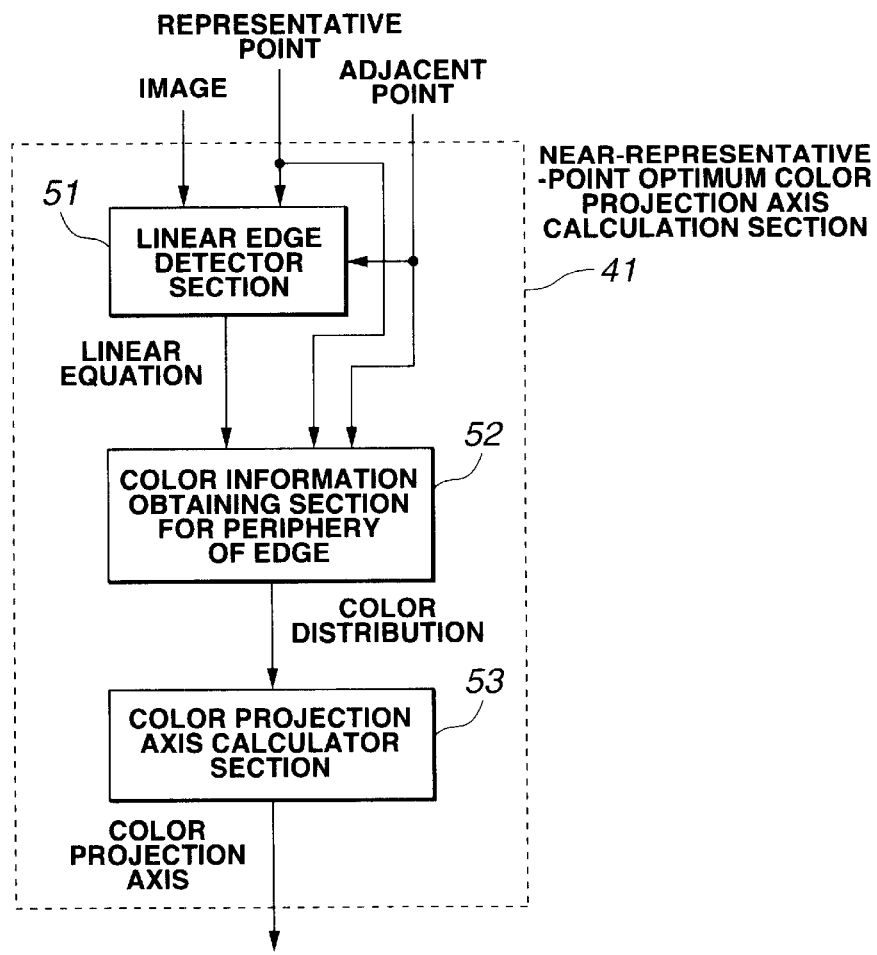
FIG. 11 is a block diagram showing the structure of a near-representative-point optimum color projection axis calculator section forming part of the optimum color projection axis calculator section shown in FIG. 8.

For example, in the near-representative-point color projection axis calculator section 41 shown in FIG. 11, only one line that has the strongest edge is obtained by the linear edge detector section 51. Originally, however, a plurality of lines should be obtained by any evaluation value as has been explained with reference to FIG. 14.

Hence, based on the principle previously explained with reference to FIG. 5, the closed contour curve generator section 21 in FIG. 4 is modified from the structure shown in FIG. 6 to the closed contour curve generator section 21' having the structure shown in FIG. 19, so that a plurality of candidates are presented to the user and a selection by the user is used as a supplemental input.

The closed contour curve generator section 21' conceptually comprises a data processing section 10, a data converter section 11, a display device 12, an operation device 13, and an output data select section 14.

The data processing section 10 applies a plurality of algorithms and parameters to input data and presents a candidate list of a plurality of output data items. The data converter section 11 generates a candidate list of subjectively evaluable data items which can be evaluated from the viewpoint of a user. This candidate list is displayed on the display device 12.

When a user selects a candidate as desired by the user with use of the operation device 13 watching the display device 12, the number of the selected candidate is supplied to the output data select section 14, and the output data select section 14 sends output data as desired by the user to the display device 12 again. In this manner, the user can attain a desired result.

This closed contour curve generator section 21' comprises an change part surrounded by a broken line which is used when adding a candidate selection function, in addition to an update sector extractor section 31, a contour curve generator section 33, and an update sector synthesizer section 34 which have the same structures as those shown in FIG. 6.

Figure 5:
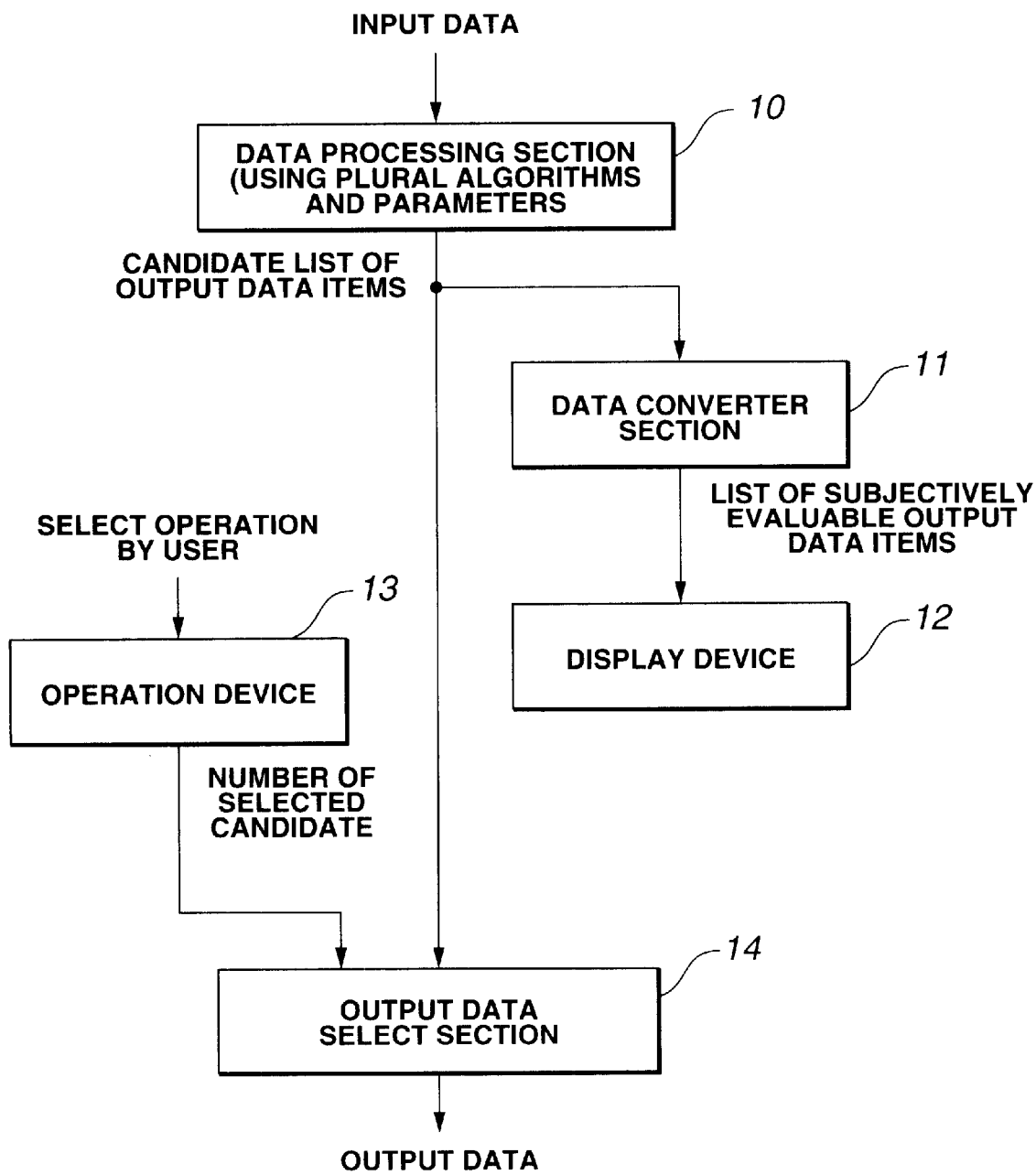
FIG. 5 is a block diagram for explaining operation principles of a closed contour curve generator section as a specific example of the contour extraction apparatus according to the present invention, which is applied to the key generator device.

This change part for adding a candidate select function comprises a color projection axis candidate calculator section 32' which calculates a plurality of color projection axes, a contour curve generator section 33 which generates a contour curve candidate list corresponding to the list of the plurality of color projection axis candidates, and a candidate list select section 71 which displays a contour curve candidate list generated by the contour curve generator section 33 on a display device 12 as shown in FIG. 5 and invites the user to make selection. The candidate list select section 71 sends the color projection axis selected by the user to the contour curve generator section 33.

Figure 20:
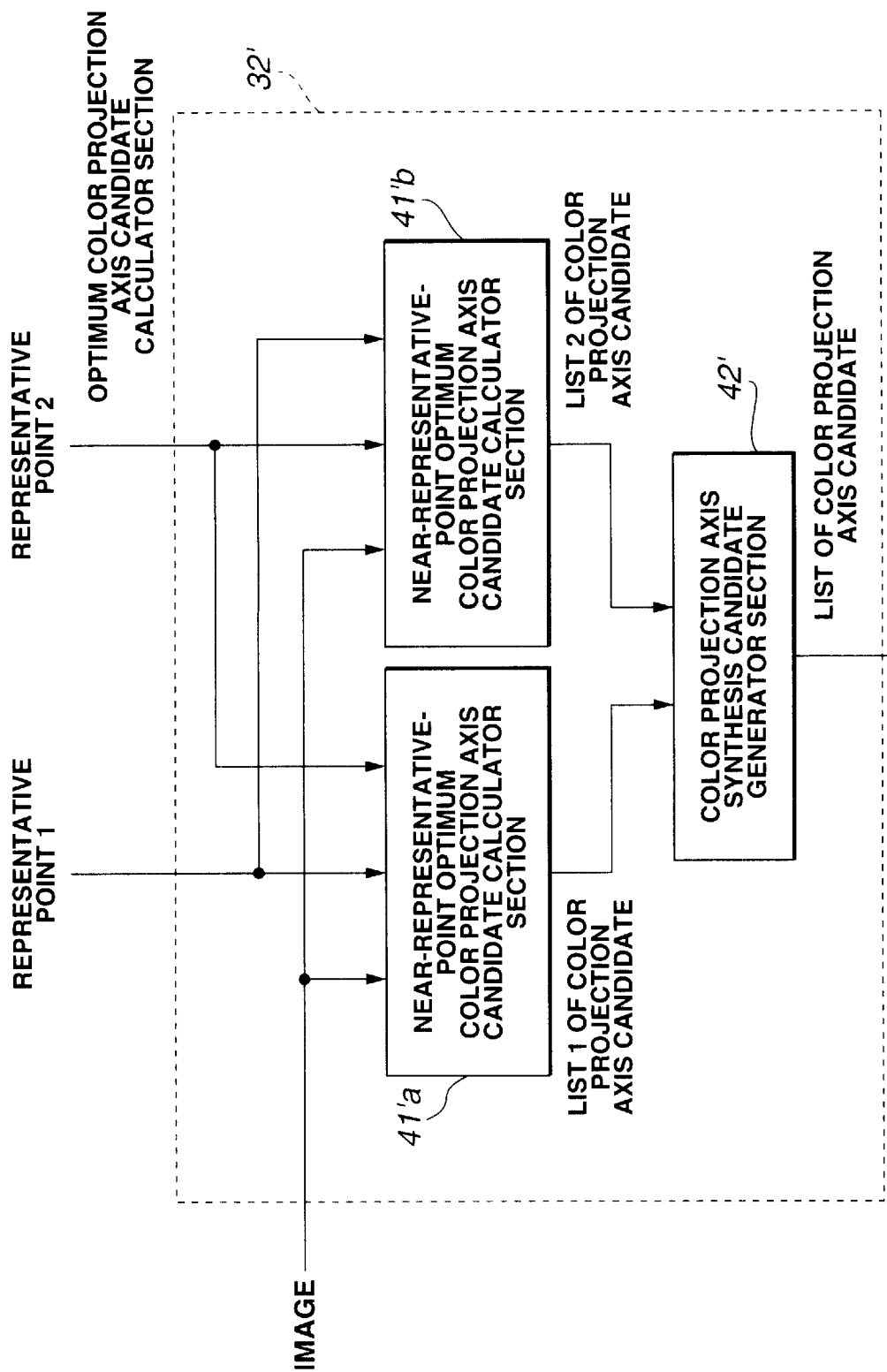
FIG. 20 is a block diagram showing an optimum color projection axis candidate calculator section forming part of the closed contour curve generator section shown in FIG. 19.

FIG. 20 shows a specific structure of the color projection axis candidate calculator section 32'. The color projection axis candidate calculator section 32' is comprised of near-representative-point optimum color projection axis candidate calculator sections 41'a and 41'b which calculate a plurality of candidates for optimum color projection axes of the near representative points 1 and 2, and a color projection axis synthesis candidate generator section 42' which generates a color projection axis synthesis candidate with use of lists 1 and 2 from the two calculator sections 41'a and 41'b. Where n and m candidates are respectively listed in the lists 1 and 2 from the two calculator sections 41'a and 41'b, the color projection axis synthesis candidate generator section 42' generates a list of n m candidates.

The near-representative-point color projection axis candidate calculator section 41' lists up and outputs the plurality of color projection axis candidates by a linear equation.

Figure 21:
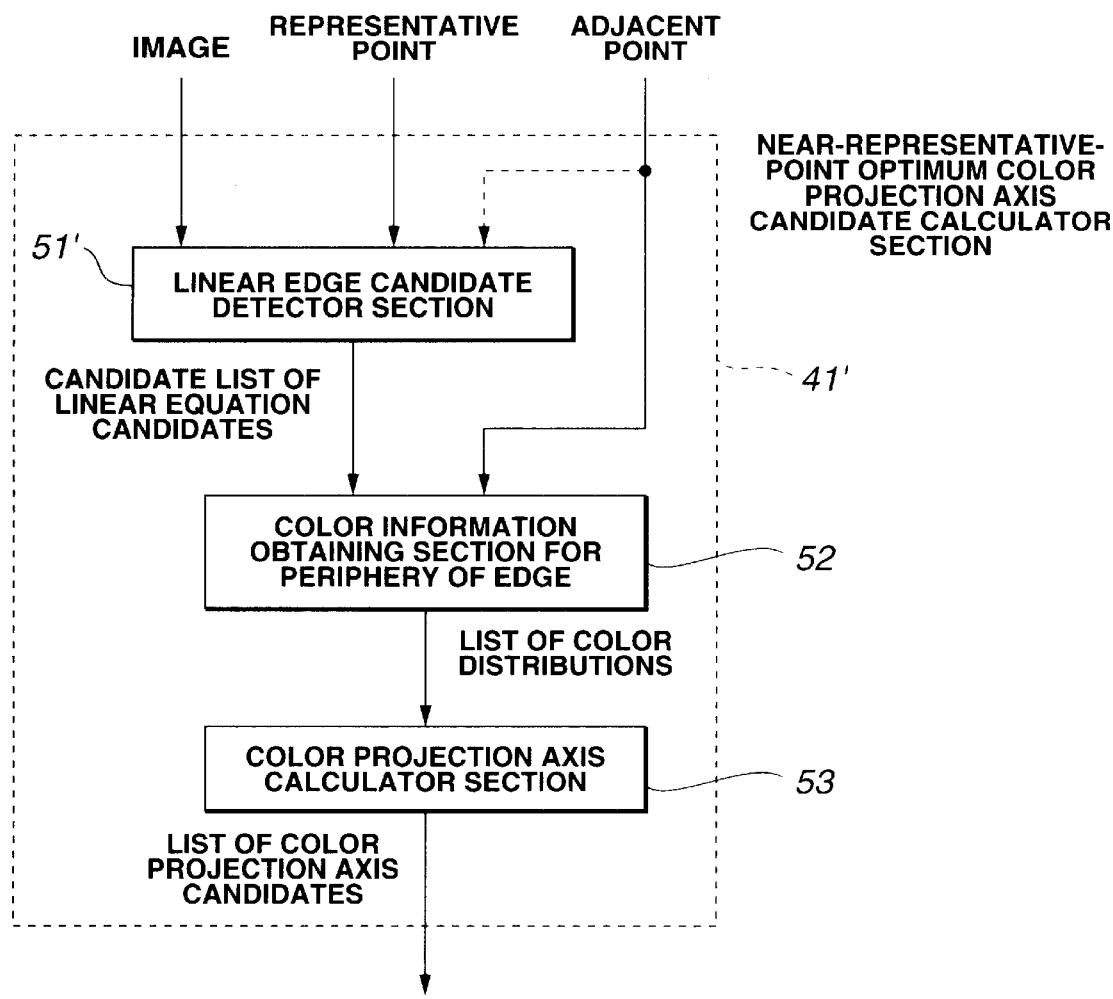
FIG. 21 is a block diagram showing a near-representative-point optimum color projection axis candidate calculator section forming part of the color projection axis candidate calculator section shown in FIG. 20.

FIG. 21 shows the specific structure of the near-representative-point optimum color projection axis candidate calculator section 41'. The near-representative-point optimum color projection axis candidate calculator section 41' is comprised of a linear edge candidate detector section 51', a color information obtaining section 52 for the periphery of the edge, and a color projection axis candidate calculator section 53.

For example, the linear edge candidate detector section 51' inside the near-representative-point color projection axis candidate calculator section 41'a which obtains color projection axis candidates near the representative point 1 detects a plurality of linear edge components included within a near area A0 of the representative point 1 (p0) indicated in FIG. 9, based on an image, the representative point 1, and an adjacent point (adjacent representative point 2), and obtains equations of the lines thereby to generate a candidate list of a plurality of linear equations.

Also, the linear edge candidate detector section 51' inside the near-representative-point color projection axis candidate calculator section 41'b which obtains color projection axis candidates near the representative point 2 detects a plurality of linear edge components included within a near area A1 of the representative point 2 (p1) indicated in FIG. 9, based on an image, the representative point 1, and an adjacent point (adjacent representative point 2), and obtains equations of the lines thereby to generate a candidate list of a plurality of linear equations.

The color information obtaining section 52 for the edge periphery and the color projection axis calculator section 53 output a list of plural candidates.

Figure 19:
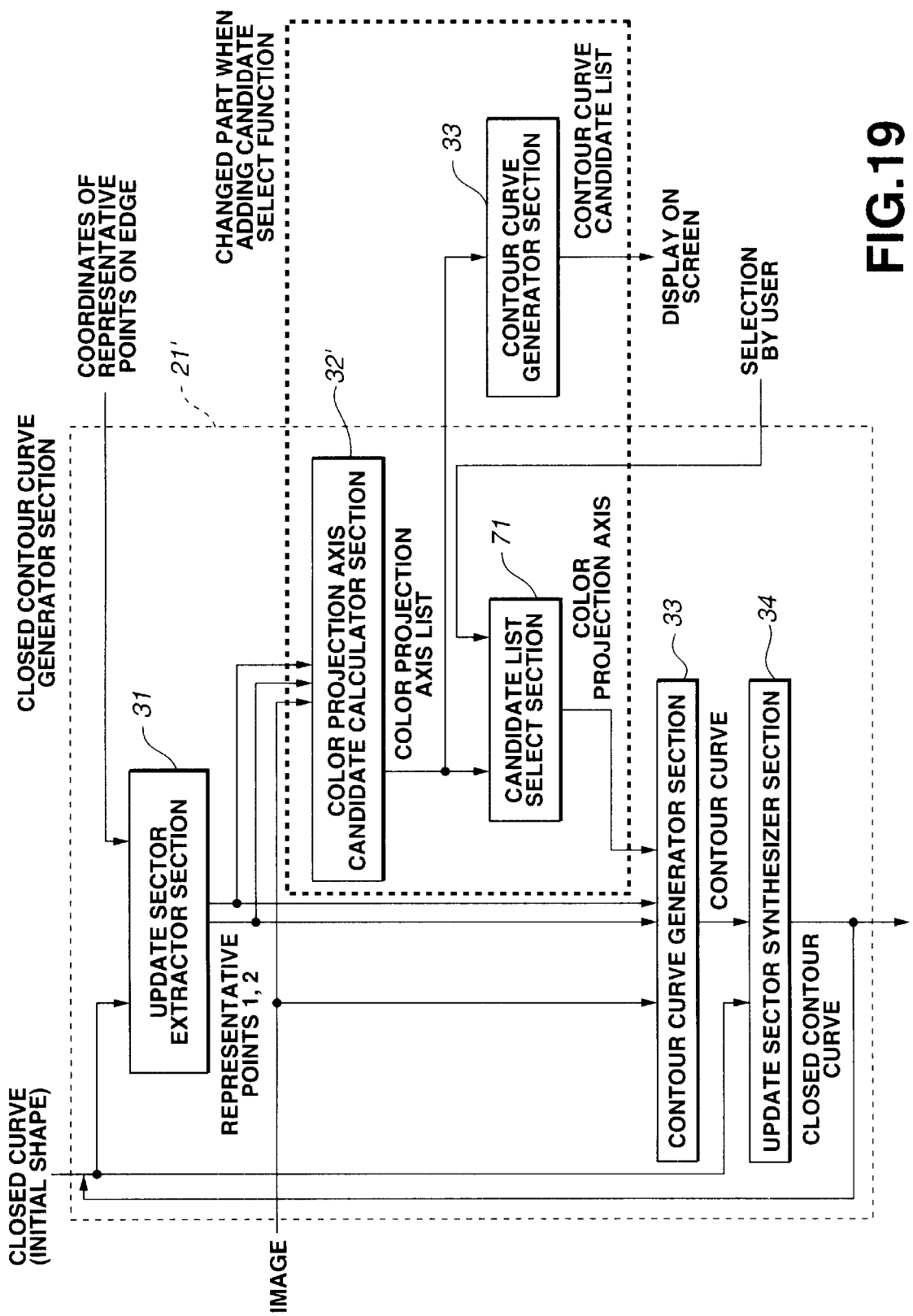
FIG. 19 is a block diagram showing the structure of a closed contour curve generator section which presents a plurality of contour curve candidates to invite a user to make selection.

Therefore, the color projection axis candidate calculator section 32' in the closed contour curve generator section 21' shown in FIG. 19 can send a color projection axis candidate list to the contour curve generator section 33 and the candidate list select section 71.

Figure 18:
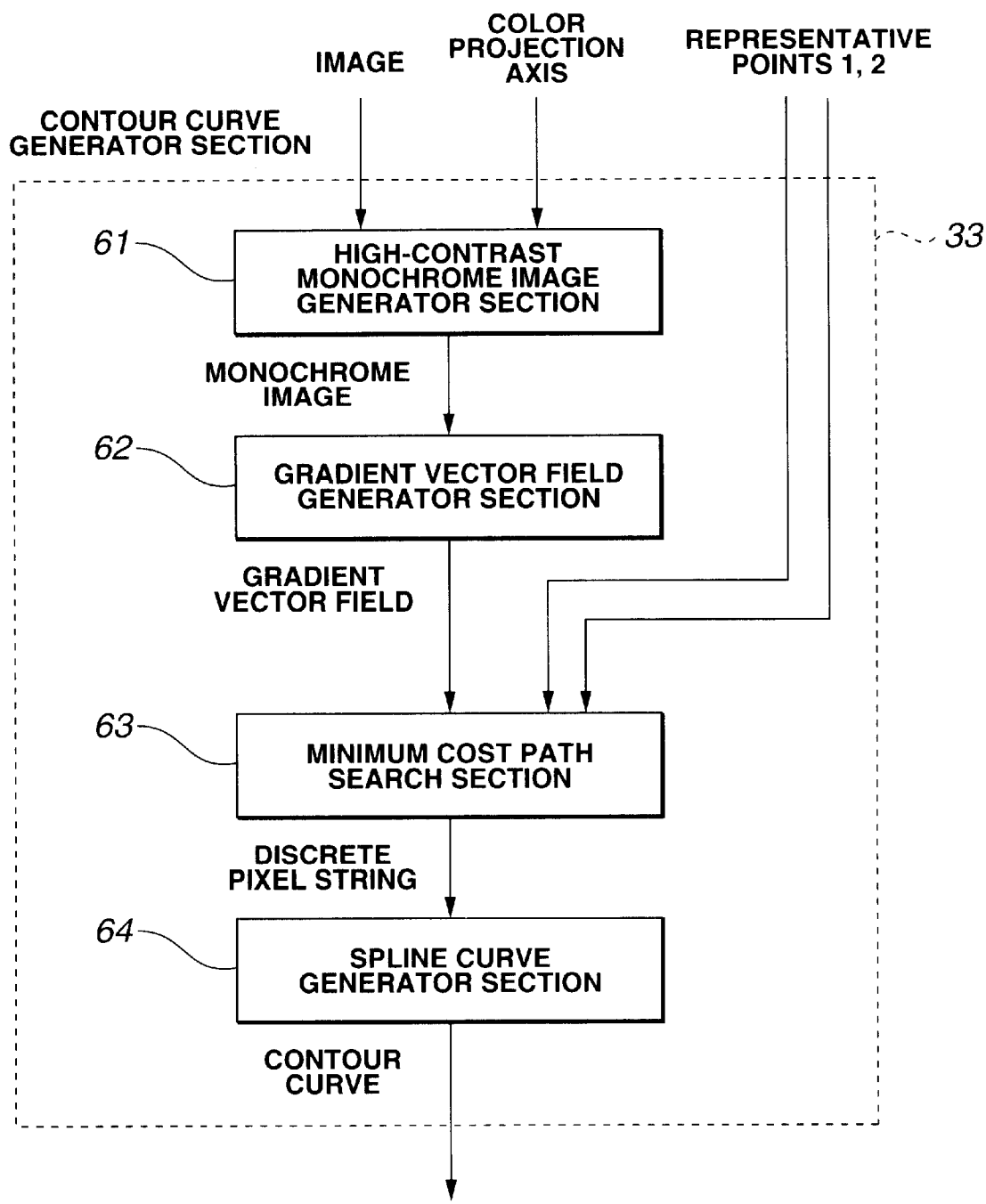
FIG. 18 is a block diagram showing the structure of a contour curve generator section forming part of the closed contour curve generator section shown in FIG. 6.

The contour curve generator section 33, which has a structure similar to that shown in FIG. 18, generates a plurality of contour curve candidate lists in response to the color projection axis candidate list, and displays the lists on the display device. That is, the contour curve generator section 33 converts a plurality of color projection axis candidates into data which the user can evaluate subjectively, and displays the data on the display device 12 shown in FIG. 5, for example, such that a plurality of contour curves can be switched from each other. Otherwise, the plurality of contour curves may be displayed to be overlapped on each other or may be displayed at once on a plurality of windows.

The user can select a contour curve as the user desires among the plurality of contour curves displayed on the display device 12. The result of selection made by the user is inputted to the candidate list select section 71. The candidate list select section 71 selects, from the candidate list, the contour curve on the display device 12 which is selected by the user, and supplies the color projection axis to the contour curve generator section 33 which originally forms the contour curve generator section 21'.

The contour curve generator section 33 calculates a contour curve, based on the color projection axis selected by the candidate list select section 71, and supplies the contour curve to the update sector synthesizer section 34.

The update sector synthesizer section 34 synthesizes the contour curve of the update sector with a closed curve thereby to generates a new closed contour curve. While update is taking place by moving, adding, or deleting a representative point by a user, the closed contour curve is kept being updated.

The above has explained the contour curve generator section 21'. This contour curve generator section 21' is used in place of the closed contour curve generator section 21 forming part of the key generator apparatus shown in FIG. 4.

Figure 22A:
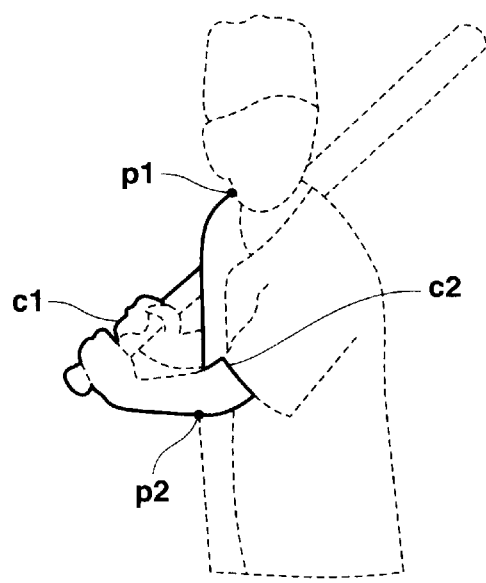
FIGS. 22A and 22B are views for explaining operation of a key generator apparatus including the closed contour curve generator section shown in FIG. 19.
Figure 22B:
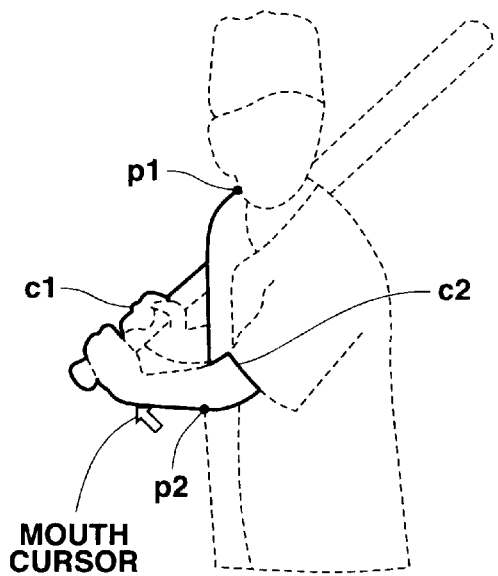
Figure 22C:
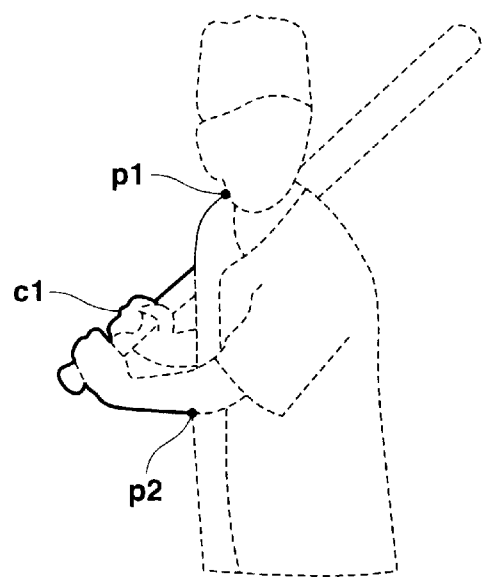

With reference to FIGS. 22A, 22B and 22C, explanation will be made of the operation in the key generator apparatus in this case.

Representative points p1 and p2 on an edge are specified by a user, and thereafter, paths c1 and c2 are presented as candidates of a contour on the display device 12, as shown in FIG. 22(A). FIG. 22(B) shows a state where the user has moved a mouse cursor close to cl in order to select cl. When the user clicks, cl is fixed.

According to conventional methods, if an expected contour curve could not be obtained, there is no other way than to change, add, or delete the position of the edge representative point. In contrast, in the key generator apparatus whose operation has been explained with reference to FIGS. 22A, 22B and 22C, only one step of one click on a desired contour is sufficient as an operation for obtaining an expected contour curve, and it can hence be found that the operation until attaining a desired contour curve can be reduced apparently.

Figure 23:
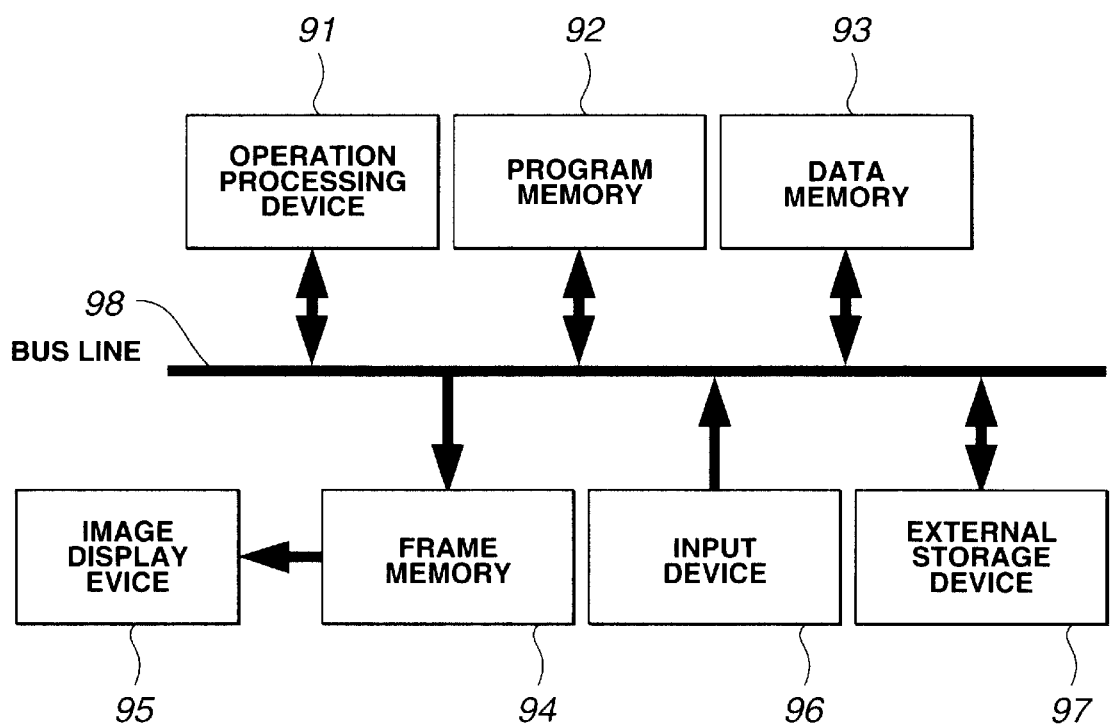
FIG. 23 is a block diagram showing a computer system which uses the contour extraction method as a software program.

Also, in the key generator apparatus described above, the contour extractor device of the present invention has been explained as being used like a hardware in the contour curve generator section 21'. However, the contour extraction method of the present invention may be realized in form of a software program and may be processed in a computer system as shown in FIG. 23, for example.

This computer system is constructed by connecting an operation processing device 91, a program memory 92, a data memory 93, a frame memory 94, an image display device 95, an input device 96, and an external device 97 to a bus 98.

The program memory 92 stores the contour extraction method as a software program. The operation processing device 91 reads the software program from the program memory 92 and executes the program. The data memory 93 stores data being processed by the operation processing device 91.

The frame memory 94 stores image data for image display, which the operation processing device 91 has obtained by executing the software program. The image data stored in the frame memory 94 is displayed on the image display device 95 so the user can watch the image data. The image display device 95 is capable of displaying multiple windows and can display a plurality of images simultaneously.

For example, a mouse or keyboard is used as the input device 96, and data is inputted from a user the external storage device 97 stores image data and the like. The bus 98 connects the respective parts described above to transfer program codes and data between each other.

Image data is stored in the data memory 93. When coordinates of two points indicating a sector from which a contour curve should be obtained are inputted through the input device 96 by the user, a candidate list is obtained and imaged by the operation processing device 91, and is thereafter outputted through the frame memory 94 to the image display device 95.

Based on candidates displayed on the image display device 95, the user inputs a contour curve as the user expects, through the input device 96. Then, a contour curve which most matches with the user's expectation is stored into the data memory 93. The image data and/or contour curve stored in the data memory 93 is imaged in accordance with an instruction from the user and is outputted through the frame memory to the image display device 95.

Figure 17B:
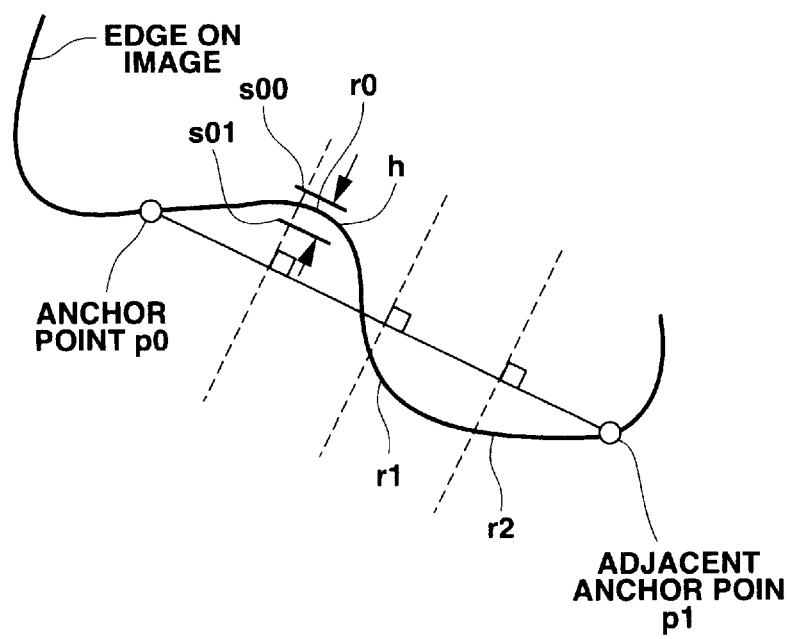

The color projection axis candidate calculator section 32' in the closed contour curve generator section 21' shown in FIG. 19 shows a specific example where a plurality of candidates are calculated with user of an equal algorithm while changing parameters. For example, as the algorithm, the method of obtaining color projection axes within areas near representative points as shown in FIGS. 8 to 16 or the method of equally dividing a line segment which connects representative points as shown in FIGS. 17A and 17B are each used singly while parameters are changed.

The color projection axis candidate calculator section 32' may calculate a plurality of color projection axis candidates by means of a plurality of algorithms including the above two algorithms, and the candidates may be presented to the user.

The present invention is not limited to the case of detecting an edge but may be applied to all kinds of data processing that are capable of outputting a plurality of candidates and converting the candidates into data which can be subjectively evaluated.

What is claimed is:

1. A contour extraction apparatus which extracts a contour of an object from an image, comprising:

update sector extractor means for obtaining a set of representative points which sandwich an update sector, from coordinates of representative points on an edge of the object and an initial closed curve;

color projection axis calculator means for obtaining a color projection axis, based on color information within the update sector obtained by the update sector extractor means;

contour curve generator means for generating a contour curve within the update sector, from the color projection axis obtained by the color projection axis calculator means, the set of representative points obtained by the update sector extractor means, and the image; and closed contour curve synthesizer means for synthesizing the contour curve within the update sector, which has been generated by the contour curve generator means, with the closed contour curve, thereby to generate a new closed contour curve.

2. An apparatus according to claim 1, wherein the color projection axis calculator means obtains a color projection axis which maximizes contrast around an edge within the update sector, from the set of representative points obtained by the update sector extractor means and the image.

3. An apparatus according to claim 2, wherein the color projection axis calculator means includes near-area optimum color projection axis calculator means for calculating an optimum color projection axis within a near area close to each of the set of representative points, and color projection axis synthesizer means for maximizing the contrast around the edge within the update sector, with use of two optimum color projection axes calculated by the near-area optimum color projection axis calculator means.

4. An apparatus according to claim 3, wherein the near-area optimum color projection axis calculator means includes linear edge detector means for detecting a linear edge component within each of the near areas, based on the image and the representative points, color information obtaining means for obtaining color information around the linear edge component detected by the linear edge detector means, and color projection axis calculator means for obtaining color projection axis which maximizes contrast of an edge, from the color information obtained by the color information obtaining means.

5. An apparatus according to claim 4, wherein the linear edge detector means includes near-area clipping means for clipping out a partial image of a near area of a representative point from the image, monochrome image generator means for generating a monochrome image of the partial image clipped by the near-area clipping means, a gradient image generator means for generating a gradient image from the monochrome image generated by the monochrome image generator means, two-dimensional histogram generator means for generating a two-dimensional histogram consisting of an angle θ of a gradient direction and a signed distance ρ between an edge and a representative point, priority level generator means for ranking priority levels of the angle θ and the signed distance ρ generated by the two-dimensional histogram generator means, and linear equation calculator means for obtaining coefficients of the linear equation of a linear edge, based on values of the angle θ and the signed distance ρ whose priority levels have been ranked by the priority level generator means.

6. An apparatus according to claim 4, wherein the color information obtaining means performs sampling around the linear edge component thereby to generate a histogram having color distributions classified into one side and another side of an edge.

7. An apparatus according to claim 6, wherein when a line approximating an edge to an edge of the image is set, the color information obtaining means sets two circles having an equal radius, at positions which are distant by a predetermined distance in a direction vertical to the line in both sides of the line and passing through a point on the line, and samples colors within areas of the circles.

8. An apparatus according to claim 4, wherein the color projection axis calculator means calculates, as the color projection axis, a vector which connects centers of gravity points of distributions in both the one and another sides of an edge in a color space of color distribution information obtained by the color information obtaining means.

9. An apparatus according to claim 4, wherein the color projection axis calculator means calculates, as the color projection axis, an axis which maximizes a ratio between an in-class distribution and a between-class distribution of each of the one side and another side of the edge in a color space of color distribution information obtained by the color information obtaining means.

10. An apparatus according to claim 2, wherein with respect to each of a plurality of points set at equal intervals on a line segment connecting the set of representative points set on the edge of the image, the color projection axis calculator means searches an area which has a largest color change on a vertical line segment extended in both sides of the line segment in a direction vertical to the line segment, and obtains the color projection axis by calculation.

11. An apparatus according to claim 10, wherein the color projection axis calculator means obtains a color change vector on the vertical line segment, obtains maximum color change points at which the color change vector is maximized, and obtains the color projection axis by calculation from an average vector of color change vectors on the maximum color change points.

12. An apparatus according to claim 1, wherein the color projection axis calculator means obtains a plurality of color projection axis candidates within the update sector, converts the plurality of color projection axis candidates into data which can be subjectively evaluated by an operator, presents the data to the operator, and determines a color projection axis by a supplemental input from the operator.

13. An apparatus according to claim 12, wherein the color projection axis calculator means obtains a plurality of color projection axis candidate by applying an algorithm while changing a parameter or by applying a plurality of algorithms, converts the plurality of color projection axis candidates into data which can be subjectively evaluated by an operator, presents the data to the operator, and determines a color projection axis by a supplemental input from the operator.

14. An apparatus according to claim 13, wherein the color projection axis calculator means includes color projection axis candidate calculator means for obtaining a plurality of color projection axis candidates from the set of representative points obtained by the update sector extractor means and the image, contour curve generator means for generating contour curves respectively including the plurality of color projection axis candidates obtained by the color projection axis calculator means, and color projection axis select means for selecting a color projection axis included in the contour curve selected by subjective evaluation after the operator watches the plurality of contour curves generated by the contour curve generator means.

15. An apparatus according to claim 14, wherein the color projection axis candidate calculator means includes near-area optimum color projection axis candidate calculator means for calculating a plurality of optimum color projection axis candidates within a near area for each of the set of representative point, and color projection axis synthesis candidate means for synthesizing a color projection axis candidate which maximizes contrast around an edge within the update sector, with use of the optimum color projection axis candidates calculated by the near-area optimum color projection axis candidate calculator means.

16. An apparatus according to claim 15, wherein the near-area optimum color projection axis candidate calculator means includes linear edge detector means for detecting a plurality of linear edge component candidates, based on the image and the representative points, within each of the near areas, color information obtaining means for obtaining color information around the plurality of edge component candidates detected by the linear edge detector means, and color projection axis candidate calculator means for obtaining a plurality of candidates of a color projection axis, from the color information obtained by the color information obtaining means.

17. An apparatus according to claim 16, wherein the linear edge detector means includes near-area clipping means for clipping out a partial image of a near area of a representative point from the image, monochrome image generator means for generating a monochrome image of the partial image clipped by the near-area clipping means, a gradient image generator means for generating a gradient image from the monochrome image generated by the monochrome image generator means, two-dimensional histogram generator means for generating a two-dimensional histogram consisting of an angle θ of a gradient direction and a signed distance ρ between an edge and a representative point, priority level generator means for ranking priority levels of the angle θ and the signed distance ρ generated by the two-dimensional histogram generator means, and linear equation calculator means for obtaining a coefficient of a linear edge, based on values of the angle θ and the signed distance ρ whose priority levels have been ranked by the priority level generator means.

18. An apparatus according to claim 16, wherein the color information obtaining means performs sampling around the linear edge component thereby to generate a histogram having color distributions classified into one side and another side of an edge.

19. An apparatus according to claim 18, wherein when a line approximating an edge to an edge of the image is set, the color information obtaining means sets two circles having an equal radius, at positions which are distant by a predetermined distance in a direction vertical to the line in both sides of the line and passing through a point on the line, and samples a color within the area of the circle.

20. An apparatus according to claim 14, wherein the color projection axis candidate calculator means calculates, as the color projection axis, a vector which connects centers of gravity points of distributions in both the one and another sides of an edge in a color space of color distribution information obtained by the color information obtaining means.

21. An apparatus according to claim 14, wherein the color projection axis candidate calculator means calculates, as the color projection axis, an axis which maximizes a ratio between an in-class distribution and a between-class distribution of each of the one side and another side of the edge in a color space of color distribution information obtained by the color information obtaining means.

22. An apparatus according to claim 14, wherein with respect to each of a plurality of points set at equal intervals on a line segment connecting the set of representative points set on the edge of the image, the color projection axis candidate calculator means searches an area which has a largest color change on a vertical line segment extended in both sides of the line segment in a direction vertical to the line segment, and obtains the color projection axis by calculation.

23. An apparatus according to claim 22, wherein the color projection axis candidate calculator means obtains a color change vector on the vertical line segment, obtains maximum color change points at which the color change vector is maximized, and obtains the color projection axis by calculation from an average vector of color change vectors on the maximum color change points.

24. A contour extraction method for extracting a contour of an object from an image, comprising:

an update sector extract step of obtaining a set of representative points which sandwich an update sector, from coordinates of representative points on an edge of the object and an initial closed curve;

a color projection axis calculate step of obtaining a color projection axis, based on color information within the update sector, obtained by the update sector extract step;

a contour curve generate step of generating a contour curve within the update sector, from the color projection axis obtained by the color projection axis calculate step, the set of representative points obtained by the update sector extract step, and the image; and a closed contour curve synthesize step of synthesizing the contour curve within the update sector, which has been generated by the contour curve generate step, with the closed contour curve, thereby to generate a new closed contour curve.

25. A method according to claim 24, wherein the color projection axis calculate step obtains a color projection axis which maximizes contrast around an edge within the update sector, from the set of representative points obtained by the update sector extract step and the image.

26. A method according to claim 25, wherein the color projection axis calculate step includes a near-area optimum color projection axis calculator step of calculating an optimum color projection axis within a near area close to each of the set of representative points, and a color projection axis synthesize step of maximizing the contrast around the edge within the update sector, with use of two optimum color projection axes calculated by the near-area optimum color projection axis calculate step.

27. A method according to claim 26, wherein the near-area optimum color projection axis calculate step includes a linear edge detect step of detecting a linear edge component within each of the near areas, based on the image and the representative points, a color information obtain step of obtaining color information around the linear edge component detected by the linear edge detect step, and a color projection axis calculate step of obtaining a color projection axis which maximizes contrast of an edge, from the color information obtained by the color information obtain step.

28. A method according to claim 27, wherein the color information obtain step performs sampling around the linear edge component thereby to generate a histogram having color distributions classified into one side and another side of an edge.

29. A method according to claim 28, wherein when a line approximating an edge to an edge of the image is set, the color information obtain step sets two circles having an equal radius, at positions which are distant by a predetermined distance in a direction vertical to the line in both sides of the line and passing through a point on the line, and samples colors within areas of the circles.

30. A method according to claim 27, wherein the color projection axis calculate step calculates, as the color projection axis, a vector which connects centers of gravity points of distributions in both the one and another sides of an edge in a color space of color distribution information obtained by the color information obtain step.

31. A method according to claim 27, wherein the color projection axis calculate step calculates, as the color projection axis, an axis which maximizes a ratio between an in-class distribution and a between-class distribution of each of the one side and another side of the edge in a color space of color distribution information obtained by the color information obtain step.

32. A method according to claim 25, wherein with respect to each of a plurality of points set at equal intervals on a line segment connecting the set of representative points set on the edge of the image, the color projection axis calculate step searches an area which has a largest color change on a vertical line segment extended in both sides of the line segment in a direction vertical to the line segment, and obtains the color projection axis by calculation.

33. A method according to claim 32, wherein the color projection axis calculate step obtains a color change vector on the vertical line segment, obtains a maximum color change point at which the color change vector is maximized, and obtains the color projection axis by calculation from an average value of the maximum color change point.

34. A method according to claim 24, wherein the color projection axis calculate step obtains a plurality of color projection axis candidates within the update sector, converts the plurality of color projection axis candidates into data which can be subjectively evaluated by an operator, presents the data to the operator, and determines a color projection axis by a supplemental input from the operator.

35. A method according to claim 34, wherein the color projection axis calculate step obtains a plurality of color projection axis candidate by applying an algorithm while changing a parameter or by applying a plurality of algorithms, converts the plurality of color projection axis candidates into data which can be subjectively evaluated by an operator, presents the data to the operator, and determines a color projection axis by a supplemental input from the operator.

36. A method according to claim 34, wherein the color projection axis calculate step includes
a color projection axis candidate calculate step of obtaining a plurality of color projection axis candidates from the set of representative points obtained by the update sector extract step and the image,
a contour curve generate step of generating contour curves respectively including the plurality of color projection axis candidates obtained by the color projection axis calculate step, and
a color projection axis select step of selecting a color projection axis included in the contour curve selected by subjective evaluation after the operator watches the plurality of contour curves generated by the contour curve generate step.

37. A method according to claim 36, wherein the color projection axis candidate calculate step includes
a near-area optimum color projection axis candidate calculate step of calculating a plurality of optimum color projection axis candidates within a near area for each of the set of representative point, and
a color projection axis synthesis candidate step of synthesizing a color projection axis candidate which maximizes contrast around an edge within the update sector, with use of the optimum color projection axis candidates calculated by the near-area optimum color projection axis candidate calculate step.

38. A method according to claim 37, wherein the near-area optimum color projection axis candidate calculate step includes
a linear edge detect step of detecting a plurality of linear edge component candidates, based on the image and the representative points, within each of the near areas,
a color information obtain step of obtaining color information around the plurality of edge component candidates detected by the linear edge detect step, and
a color projection axis candidate calculate step of obtaining a plurality of candidates of a color projection axis, from the color information obtained by the color information obtain step.

39. A method according to claim 38, wherein the color information obtain step performs sampling around the linear edge component thereby to generate a histogram having color distributions classified into one side and another side of an edge.

40. A method according to claim 39, wherein when a line approximating an edge to an edge of the image is set, the color information obtain step sets two circles having an equal radius, at positions which are distant by a predetermined distance in a direction vertical to the line in both sides of the line and passing through a point on the line, and samples colors within areas of the circles.

41. A method according to claim 38, wherein the color projection axis candidate calculate step calculates, as the color projection axis, a vector which connects centers of gravity points of distributions in both the one and another sides of an edge in a color space of color distribution information obtained by the color information obtain step.

42. A method according to claim 38, wherein the color projection axis candidate calculate step calculates, as the color projection axis, an axis which maximizes a ratio between an in-class distribution and a between-class distribution of each of the one side and another side of the edge in a color space of color distribution information obtained by the color information obtain step.

43. A method according to claim 36, wherein with respect to each of a plurality of points set at equal intervals on a line segment connecting the set of representative points set on the edge of the image, the color projection axis candidate calculate step searches an area which has a largest color change on a vertical line segment extended in both sides of the line segment in a direction vertical to the line segment, and obtains the color projection axis by calculation.

44. A method according to claim 36, wherein the color projection axis candidate calculate step obtains a color change vector on the vertical line segment, obtains maximum color change point at which the color change vector is maximized, and obtains the color projection axis by calculation from an average vector of the color change vectors on the maximum color change points.

45. A program recording medium which records a contour extract program for extracting a contour of an object from an image, the program comprising:
an update sector extract step of obtaining a set of representative points which sandwich an update sector, from coordinates of representative points on an edge of the object and an initial closed curve;
a color projection axis calculate step of obtaining a color projection axis, based on color information within the update sector, obtained by the update sector extract step;
a contour curve generate step of generating a contour curve within the update sector, from the color projection axis obtained by the color projection axis calculate step, the set of representative points obtained by the update sector extract step, and the image; and
a closed contour curve synthesize step of synthesizing the contour curve within the update sector, which has been generated by the contour curve generate step, with the closed contour curve, thereby to generate a new closed contour curve.

* * * * *